United States Patent
Fujimoto et al.

(10) Patent No.: US 7,980,122 B2
(45) Date of Patent: Jul. 19, 2011

(54) INTERNAL COMBUSTION ENGINE

(75) Inventors: Yasushi Fujimoto, Saitama (JP);
Hiroyuki Kojima, Saitama (JP);
Yoshihisa Kanno, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 155 days.

(21) Appl. No.: 12/338,341

(22) Filed: Dec. 18, 2008

(65) Prior Publication Data
US 2009/0165545 A1    Jul. 2, 2009

(30) Foreign Application Priority Data

Dec. 28, 2007   (JP) .................................. 2007-341102
May 21, 2008   (JP) .................................. 2008-132645

(51) Int. Cl.
*G01M 13/02* (2006.01)
(52) U.S. Cl. .................................................. 73/115.02
(58) Field of Classification Search ............... 73/114.25, 73/115.02
See application file for complete search history.

(56) References Cited

U.S. PATENT DOCUMENTS

| | | | | |
|---|---|---|---|---|
| 4,817,470 A | * | 4/1989 | Muller et al. ................. | 477/110 |
| 4,957,019 A | * | 9/1990 | Kubo ........................... | 74/665 H |
| 5,020,391 A | * | 6/1991 | Aoki et al. .................... | 477/143 |
| 6,435,999 B1 | * | 8/2002 | Nanri et al. .................... | 475/76 |
| 6,471,619 B2 | * | 10/2002 | Nanri et al. .................... | 477/52 |
| 6,632,156 B2 | * | 10/2003 | Nanri et al. .................... | 477/68 |
| 7,409,886 B2 | * | 8/2008 | Gitt ................................ | 74/342 |
| 7,730,800 B2 | * | 6/2010 | Sorani et al. .................. | 74/331 |
| 2001/0036881 A1 | * | 11/2001 | Nanri et al. .................... | 477/68 |
| 2001/0041645 A1 | * | 11/2001 | Nanri et al. .................... | 477/68 |
| 2006/0219033 A1 | * | 10/2006 | Gitt ................................ | 74/330 |
| 2008/0023291 A1 | * | 1/2008 | Sorani et al. ................. | 192/87.1 |
| 2008/0087119 A1 | * | 4/2008 | Shiozaki ........................ | 74/330 |
| 2008/0128239 A1 | * | 6/2008 | Ogasawara ................. | 192/85 R |
| 2009/0132133 A1 | * | 5/2009 | Kojima et al. ................. | 701/52 |
| 2010/0107810 A1 | * | 5/2010 | Saitoh ........................... | 74/664 |

FOREIGN PATENT DOCUMENTS

| | | |
|---|---|---|
| EP | 1826053 A1 | 8/2007 |
| EP | 1906056 A1 | 4/2008 |
| JP | 10-24881 A | 1/1998 |
| JP | 10024881 * | 1/1998 |
| JP | 2000-87780 A | 3/2000 |

* cited by examiner

*Primary Examiner* — Freddie Kirkland, III
(74) *Attorney, Agent, or Firm* — Birch, Stewart, Kolasch & Birch, LLP

(57) ABSTRACT

A rotation detecting device for detecting the rotational speed of a gear in a transmission without increasing the width of the gear in the axial direction, using any expensive sensor and not limiting the location of a shift drum. An internal combustion engine includes a crankcase in which a crankshaft and a transmission are accommodated. The transmission includes a plurality of gears for shifting, an input shaft for inputting a rotational drive force from the crankshaft, and an output shaft wherein the rotational drive force is transmitted from the input shaft through the gears and to the output shaft to a drive wheel. The internal combustion engine includes rotation detecting devices for respectively detecting the rotational speeds of the gears. The rotation detecting devices respectively include detecting portions opposed to the gears rotating with the rotation of the input shaft and positioned in the axial direction of the transmission.

20 Claims, 15 Drawing Sheets

INTERNAL COMBUSTION ENGINE

CROSS-REFERENCE TO RELATED APPLICATIONS

The present application claims priority under 35 USC 119 to Japanese Patent Application No. 2007-341102 filed on Dec. 28, 2007 and Japanese Patent Application No. 2008-132645 filed on May 21, 2008 the entire contents of which are hereby incorporated by reference.

BACKGROUND OF THE INVENTION

1. Field of the Invention

The present invention relates to an internal combustion engine including a rotation detecting device for detecting the rotational speed of a gear in a transmission.

2. Description of Background Art

In connection with a transmission provided behind a crankcase, the transmission includes a shaft and a plurality of gears provided on the shaft. A rotation detecting device is known for detecting the rotational speed of the shaft in the transmission. The rotation detecting device includes a rotation sensor for detecting the rotational speed of a specific one of the plurality of gears in the transmission, the specific gear being movable in the axial direction of the shaft. See, for example, Japanese Patent Laid-Open No. 2000-87780.

In this conventional configuration, the rotation sensor is so as to face the axially movable gear in the transmission. Accordingly, to reliably detect the rotational speed of the axially movable gear regardless of the axial movement of this gear, the width of this gear in the axial direction must be increased or an expensive sensor having high sensitivity must be used as the rotation sensor.

SUMMARY AND OBJECTS OF THE INVENTION

It is accordingly an object of an embodiment of the present invention to provide an internal combustion engine including a rotation detecting device which can detect the rotational speed of a gear in a transmission without increasing the width of the gear in the axial direction and without using any expensive sensor having high sensitivity.

In accordance with an embodiment of the present invention, there is provided an internal combustion engine having a crankcase in which a crankshaft and a transmission are accommodated, said transmission having a plurality of gears for shifting, an input shaft for inputting a rotational drive force from said crankshaft, and an output shaft to which the rotational drive force is transmitted from said input shaft through said gears, the rotational drive force being further transmitted from said output shaft to a drive wheel, wherein said internal combustion engine comprises a rotation detecting device for detecting the rotational speed of a specific one of said gears included in said transmission, said rotation detecting device having a detecting portion opposed to said specific gear rotating with the rotation of said input shaft and positioned in the axial direction of said transmission.

The detecting portion of the rotation detecting device is opposed to the axially positioned gear, so that the relative positional relation between the detecting portion and the axially positioned gear in the axial direction is fixed. Accordingly, the rotational speed of this gear can be detected without increasing the facewidth of this gear, so that an increase in the width of the internal combustion engine in the axial direction of the transmission can be suppressed. Further, the rotational speed of the gear rotating with the rotation of the input shaft is detected, thereby detecting the rotational speed of the input shaft.

For example, in any vehicle such that automatic shifting is performed by driving means as in an AMT (Automated Manual Transmission), a change in the shift position can be detected by the rotation detecting device and the condition of automated shifting can be accurately grasped.

Preferably, the specific gear is provided near the center of said input shaft or said output shaft in the axial direction thereof.

In general, the shift ends of the transmission are supported through bearings or the like to the crankcase. Accordingly, if the specific gear subjected to detection of its rotational speed is provided near the shift ends of the transmission, the bearings must be shifted axially outward to ensure the space for locating the rotation detecting device. As a result, the shaft length of the transmission is increased to cause an increase in size of the internal combustion engine.

According to an embodiment of the present invention, the specific gear subjected to detection of its rotational speed is located near the center of the shaft in the transmission. Accordingly, the rotation detecting device is located apart from the bearings for supporting the shaft, so that the shaft length of the transmission need not be increased to thereby suppress an increase in the size of the internal combustion engine.

Preferably, said rotation detecting device is provided on said crankcase.

By locating the rotation detecting device on the crankcase, it is not necessary to provide any specific housing for a rotation sensor.

More preferably, said rotation detecting device is provided on a rear surface of said crankcase.

If the rotation detecting device is located on an upper surface of the crankcase, for example, the flexibility of location of various parts of an exhaust system or an intake system located above the crankcase is limited by the rotation detecting device. However, according to an embodiment of the present invention, the rotation detecting device is located on the rear surface of the crankcase. Accordingly, the flexibility of the location of the parts of the exhaust system or the intake system can be improved.

Preferably, said specific gear is provided on said output shaft behind said input shaft and in mesh with the gear larger in diameter than the gear having the smallest diameter in the gears provided on said input shaft.

In general, a gear on the output shaft as meshing with a gear having a smallest diameter on the input shaft has a diameter larger than that of any other gear on the output shaft. Accordingly, if the rotational speed of this gear meshing with the gear having the smallest diameter on the input shaft is detected, the rotation detecting device projects largely rearwardly of the internal combustion engine, which results in an increase in size of the engine in the longitudinal direction of the vehicle.

However, according to an embodiment of the present invention, the rotation detecting device is opposed to the gear meshing with the gear larger in diameter than the gear having the smallest diameter on the input shaft. Accordingly, the amount of projection of the rotation detecting device rearward of the internal combustion engine can be suppressed to thereby reduce the size of the engine.

Preferably, said input shaft comprises a first input shaft and a second input shaft; a first clutch is provided on said first input shaft and a second clutch is provided on said second input shaft with the transmission of the rotational drive force from said crankshaft to said input shaft being controlled by the operation of said first and second clutches. The rotation detecting device comprises a plurality of rotation sensors respectively corresponding to the gears rotating with the rotation of said first and second input shafts, so as to detect the rotational speeds of said first and second input shafts.

This configuration is applied to a vehicle having a twin clutch type clutch device. Also in such a vehicle, the detecting portion of each rotation detecting device is opposed to the axially positioned gear, so that the relative positional relation between the detecting portion and the axially positioned gear in the axial direction is fixed. Accordingly, the rotational speed of this gear can be detected without increasing the facewidth of this gear, so that an increase in width of the internal combustion engine in the axial direction of the transmission can be suppressed. Further, the rotational speed of each gear rotating with the rotation of the corresponding input shaft is detected, thereby detecting the rotational speed of each input shaft. Accordingly, in any vehicle such that automatic shifting is performed by driving means as in AMT, a change in shift position can be detected by each rotation detecting device and the condition of automated shifting can be accurately grasped.

Preferably, the gears rotating with the rotation of said first and second input shafts are juxtaposed to each other in the axial direction of said transmission.

With this configuration, the specific gears for detection of the rotational speed of the input shaft are axially juxtaposed to each other. Accordingly, wires for the rotation sensors respectively corresponding to the specific gears can be collected, thereby improving the workability of the wiring for the rotation sensors.

According to an embodiment of the present invention, the detecting portion of the rotation detecting device is opposed to the axially positioned gear, so that the relative positional relation between the detecting portion and the axially positioned gear in the axial direction is fixed. Accordingly, the rotational speed of this gear can be detected without increasing the facewidth of this gear, so that an increase in width of the internal combustion engine in the axial direction of the transmission can be suppressed. Further, the rotational speed of the gear rotating with the rotation of the input shaft is detected, thereby detecting the rotational speed of the input shaft. Accordingly, in any vehicle such that automatic shifting is performed by driving means as in AMT, a change in shift position can be detected by the rotation detecting device and the condition of automated shifting can be accurately grasped.

In the case that the specific gear subjected to detection of its rotational speed is located near the center of the shaft in the transmission, the rotation detecting device opposed to the specific gear is located apart from the bearings for supporting the shaft ends of the transmission. Accordingly, the shaft length of the transmission need not be increased to thereby suppress an increase in size of the internal combustion engine.

In the case that the rotation detecting device is located on the crankcase, it is not necessary to provide any specific housing for a rotation sensor.

In the case that the rotation detecting device is located on the rear surface of the crankcase, the flexibility of the location of the parts of the exhaust system or the intake system located above the crankcase can be improved as compared with the case that the rotation detecting device is located on the upper surface of the crankcase.

In the case that the specific gear subjected to detection of its rotational speed is provided on the output shaft behind the input shaft and in mesh with the gear larger in diameter than the gear having the smallest diameter on the input shaft, the diameter of the specific gear becomes relatively small. Accordingly, the amount of projection of the rotation detecting device rearward of the internal combustion engine can be suppressed to thereby reduce the size of the engine.

Also in applying the present invention to a vehicle having a twin clutch type clutch device, similar effects can be obtained.

In the case that the specific gears for detection of the rotational speeds of the first and second input shafts are axially juxtaposed to each other, wires for the rotation sensors respectively corresponding to the specific gears can be collected, thereby improving the workability of the wiring for the rotation sensors.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A preferred embodiment of the present invention will now be described with reference to the attached drawings.

Figure 1:
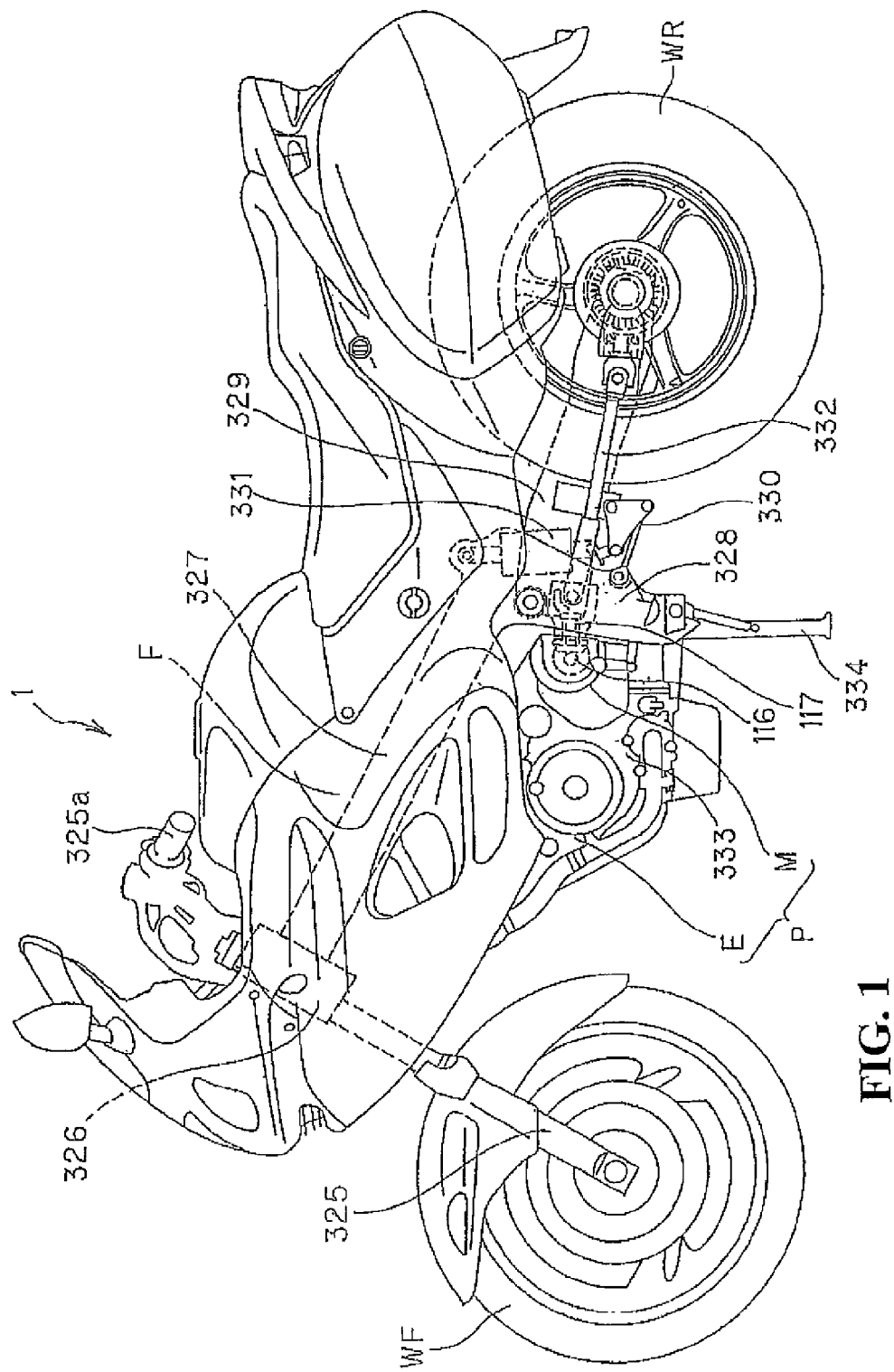
FIG. 1 is a left side view of a motorcycle.

FIG. 1 is a left side view of a motorcycle 1 to which the present invention is applied wherein the motorcycle 1 has a body frame F. The body frame F has a head pipe 326 for steerably supporting a front fork 325 for rotatably supporting a front wheel WE, a pair of right and left main frames 327 extending rearwardly from the head pipe 326 so as to be inclined downward, and a pair of right and left pivot plates 328 respectively connected to the right and left main frames 327 at their rear portions so as to extend downwardly. A swing arm 329 is pivotably supported at its front end to the pivot plates 328 with a rear wheel WR being rotatably supported to the rear portion of the swing arm 329. A steering handle 325a is provided. A link 330 is provided between the lower portions of the pivot plates 328 and the front portion of the swing arm 329. A shock absorber 331 is provided between the link 330 and the upper portions of the pivot plates 328.

A power unit P is mounted to the main frames 327 and the pivot plates 328. The power unit P has an engine E and a transmission M. A rotational drive force output from the transmission M is transmitted through a drive shaft 332 extending in the longitudinal direction of the vehicle to the rear wheel WR. A side stand 334 is mounted on an engine body 333 of the engine E or on the lower portion of the left pivot plate 328 of the body frame F. When the side stand 334 is operated for parking, the motorcycle 1 is inclined to the left.

Figure 2:
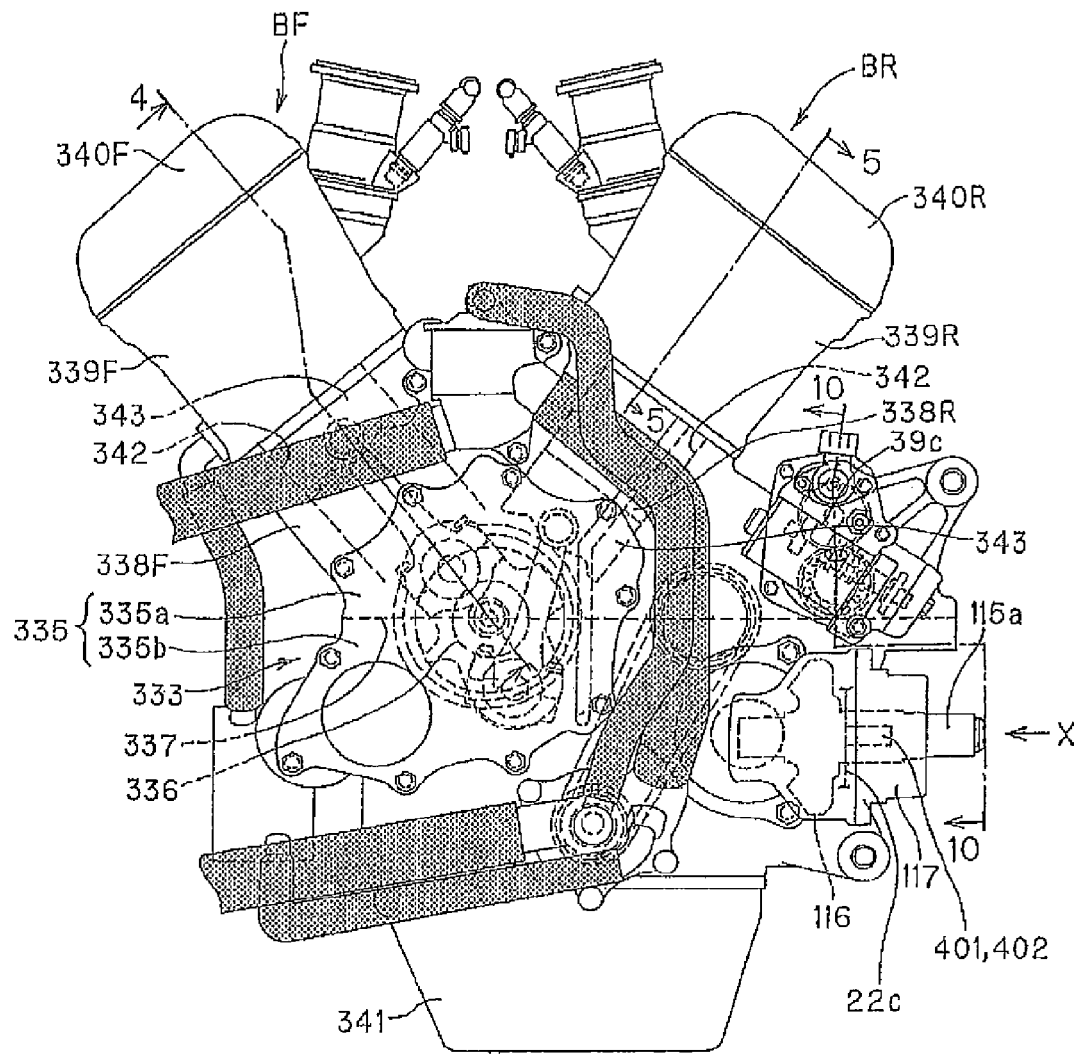
FIG. 2 is a left side view of a power unit.
Figure 3:
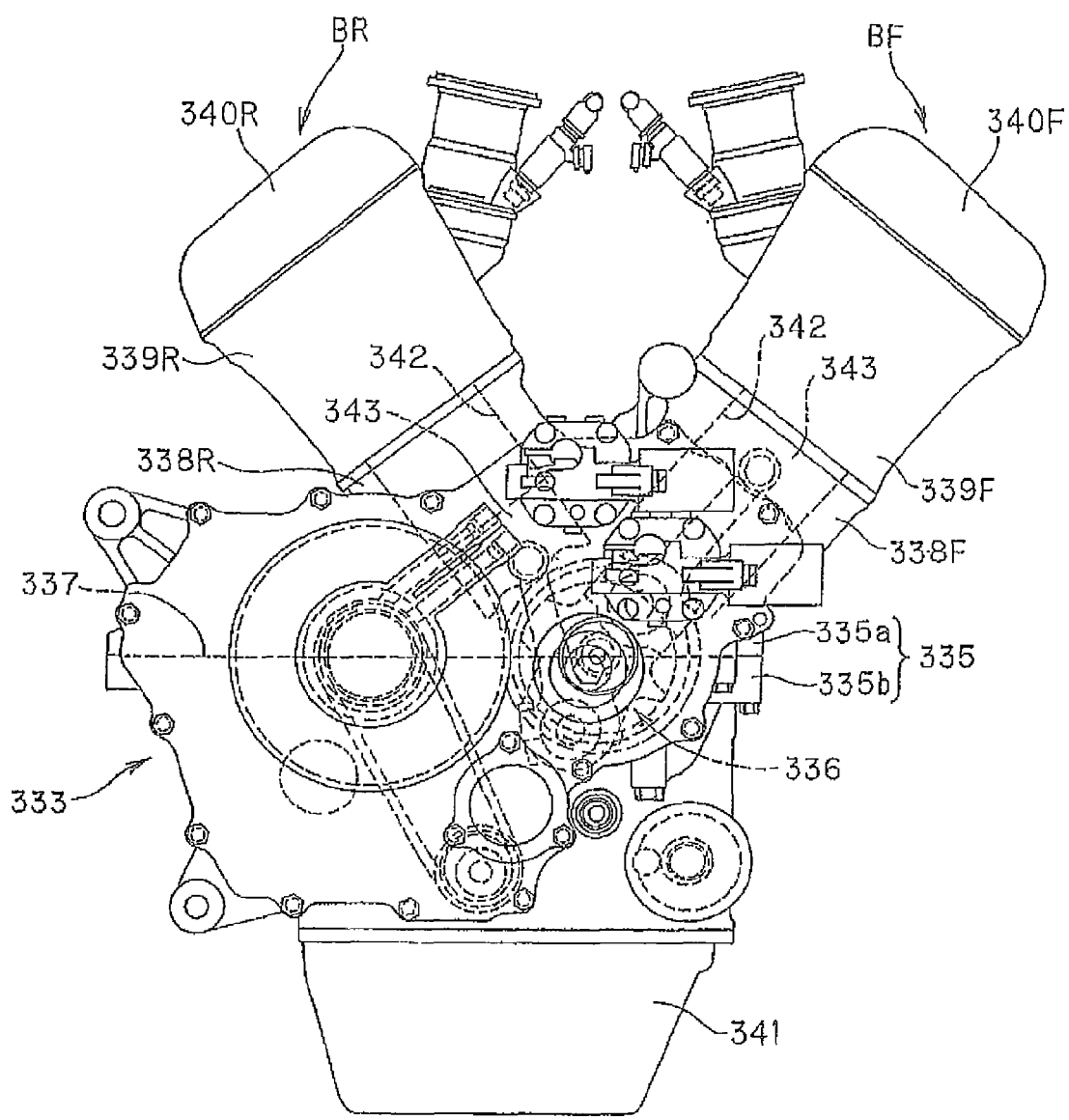
FIG. 3 is a right side view of the power unit.

As shown in FIGS. 2 and 3, the engine E is a V-type water-cooled engine such that the engine body 333 of the engine E has a front bank BF and a rear bank BR located on the rear side of the front bank BF in the longitudinal direction of the motorcycle 1. A crankshaft 336 extending in the lateral direction of the motorcycle 1 is rotatably supported to a crankcase 335 common to the front and rear banks BF and BR. The crankcase 335 is composed of an upper case half 335a and a lower case half 335b joined together. The upper case half 335a is integrally formed with a front cylinder block 338F and a rear cylinder block 338R inclined in the longitudinal direction of the vehicle so as to form a V shape as viewed in a side elevation. The axis of the crankshaft 336 lies on a joined surface 337 between the upper case half 335a and the lower case half 335b.

The front bank BF is composed of the front cylinder block 338F, a front cylinder head 339F joined to the front cylinder block 33 8F, and a front head cover 340F joined to the front cylinder head 339F. Similarly, the rear bank BR is composed of the rear cylinder block 338R, a rear cylinder head 339R joined to the rear cylinder block 338R, and a rear head cover 340R joined to the rear cylinder head 339R. An oil pan 341 is connected to the lower portion of the crankcase 335. The front cylinder block 339F is formed with two cylinder bores 342 arranged in the axial direction of the crankshaft 336. The front cylinder block 339F is joined to the crankcase 335 so that the axes of the cylinder bores 342 are inclined frontward with respect to a vertical direction in the condition where the engine body 333 is mounted on the body frame F.

Similarly, the rear cylinder block 338R is formed with two cylinder bores 342 arranged in the axial direction of the crankshaft 336. The rear cylinder block 338R is joined to the crankcase 335 so that the axes of the cylinder bores 342 are inclined to the rear with respect to a vertical direction in the condition where the engine body 333 is mounted on the body frame F. A plurality of (four in this preferred embodiment) pistons 343 are commonly connected to the crankshaft 336 so as to form a V shape. More specifically, the two front pistons 343 are slidably fitted in the two cylinder bores 342 of the front bank BF, and the two rear pistons 343 are slidably fitted in the two cylinder bores 342 of the rear bank BR.

Figure 4:
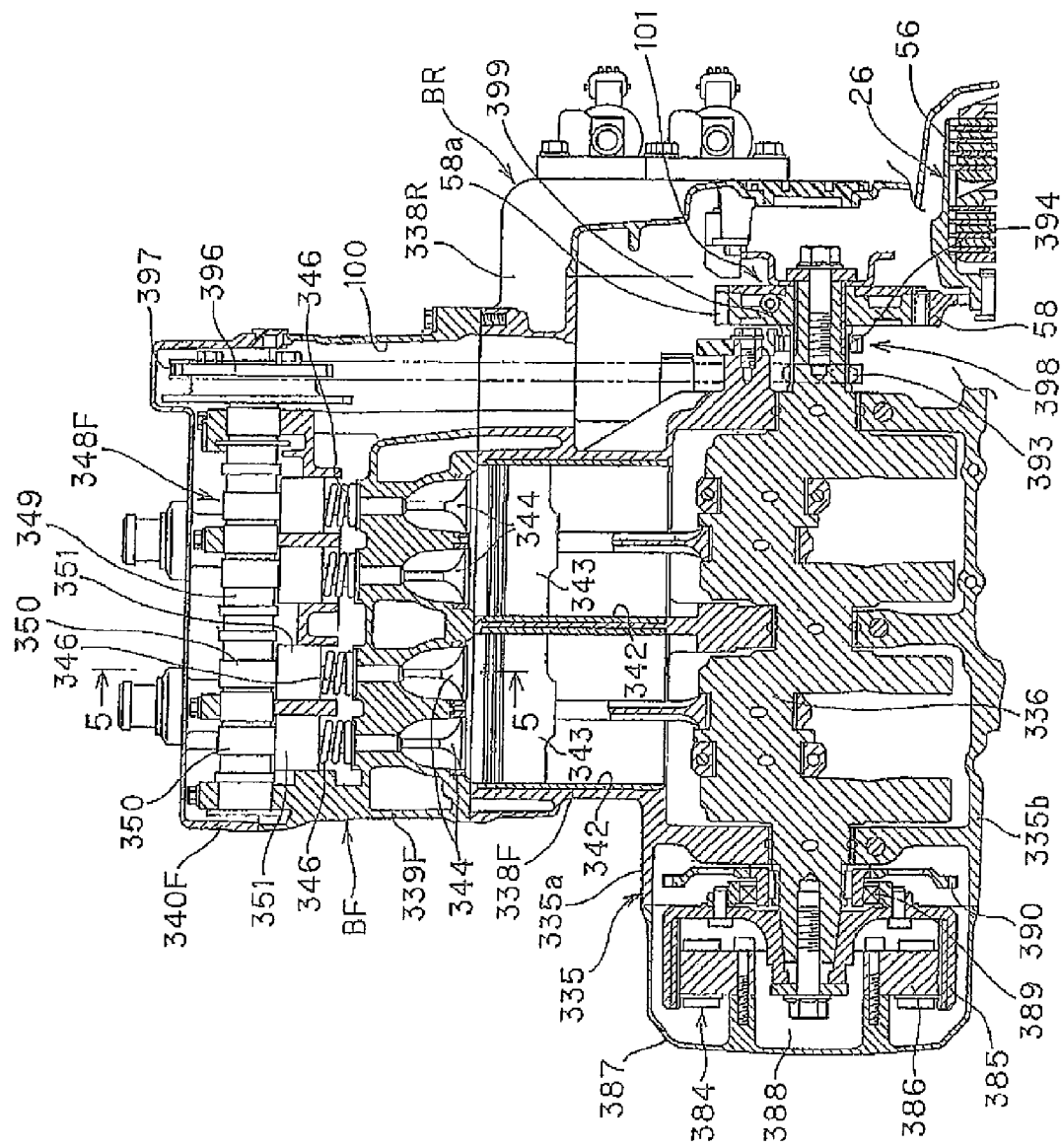
FIG. 4 is a cross section taken along the line 4-4 in FIG. 2.
Figure 5:
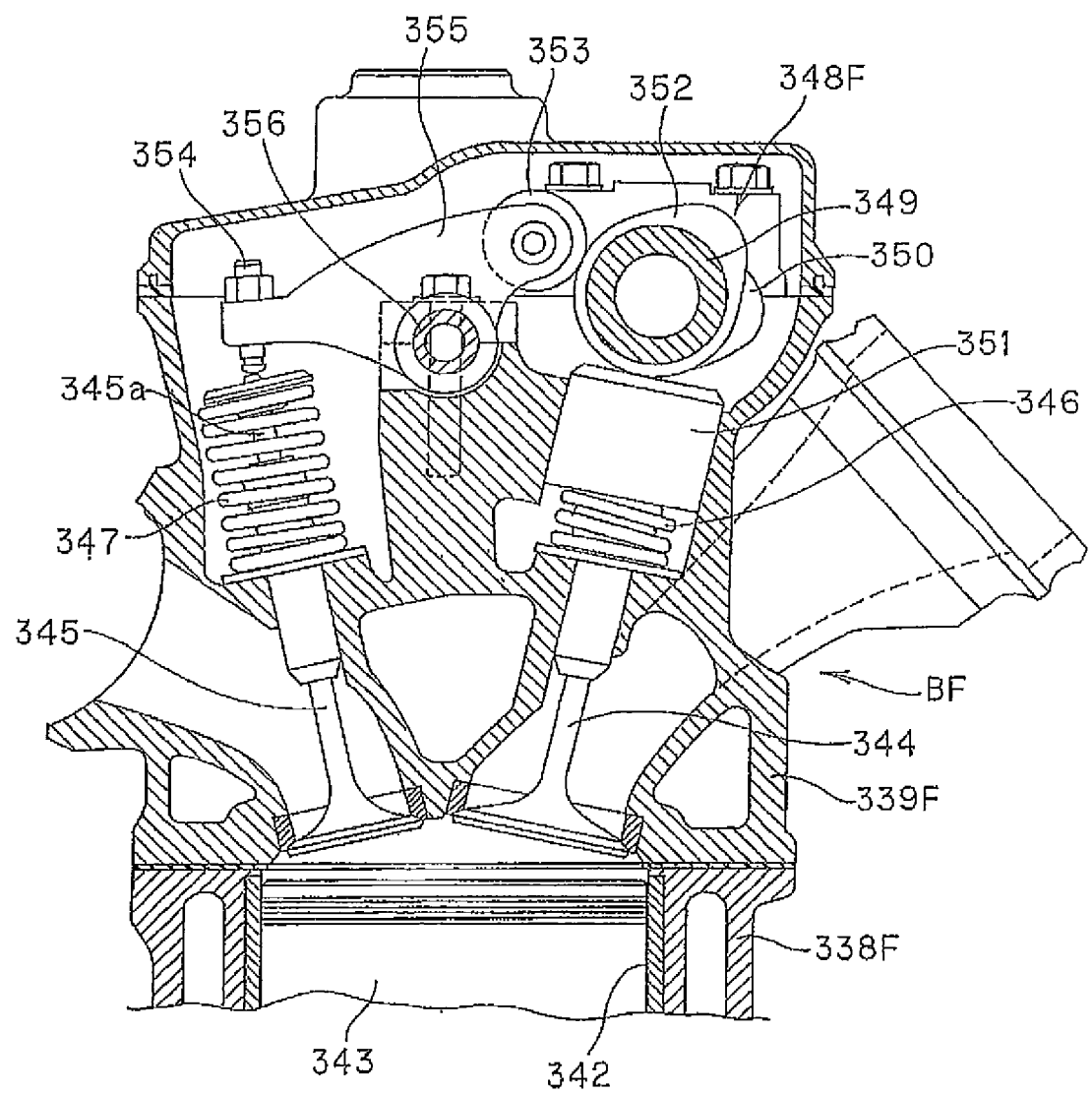
FIG. 5 is a cross section taken along the line 5-5 in FIG. 4.

As shown in FIGS. 4 and 5, the front cylinder head 339F is provided with two intake valves 344 and two exhaust valves 345 in each cylinder bore 342. Each intake valve 344 is operatively supported in the front cylinder head 339F so as to be normally biased in a valve closing direction by a valve spring 346. Similarly, each exhaust valve 345 is operatively supported in the front cylinder head 339F so as to be normally biased in a valve closing direction by a valve spring 347. Each intake valve 344 and each exhaust valve 345 are driven by a unicam type valve operating device 348F for the front bank BF.

As shown in FIG. 4, the unicam type valve operating device 348F includes a camshaft 349 having an axis parallel to the axis of the crankshaft 336 and rotatably supported to the front cylinder head 339F. As shown in FIG. 5, the camshaft 349 is located above the intake valves 344. The camshaft 349 is formed with a plurality of (four in this preferred embodiment) intake cams 350. A valve lifter 351 is in contact with each intake cam 350. The valve lifter 351 is provided at the upper end of each intake valve 344 so as to be slidably fitted to the front cylinder head 339F.

The camshaft 349 is further formed with a plurality of (four in this preferred embodiment) exhaust cams 352 arranged in parallel to the intake cams 350 so as to be axially shifted. A roller 353 is in rolling contact with each exhaust cam 352. The roller 353 is rotatably supported to a rocker arm 355 at one end thereof. Each rocker arm 355 is pivotably supported to a rocker shaft 356. The rocker shaft 356 has an axis parallel to the axis of the camshaft 349 and is fixed to the front cylinder head 339F. A tappet screw 354 is fixed to the other end of each rocker arm 355 so that the lower end of the tappet screw 354 is adjustable in position. The lower end of the tappet screw 354 is in contact with the upper end of a stem 345a of each exhaust valve 345.

A driven sprocket 396 is mounted on the right end portion of the camshaft 349 as viewed in FIG. 4, and an endless cam chain 397 is wrapped around the driven sprocket 396. On the other hand, a drive sprocket 393 is mounted on the right end portion of the crankshaft 336, and the cam chain 397 is wrapped around the drive sprocket 393. The driven sprocket 396, the cam chain 397, and the drive sprocket 393 are accommodated in a cam chain chamber 100.

Another drive sprocket 394 is fixed to the right end portion of the crankshaft 336 so as to be juxtaposed to the drive sprocket 393. The drive sprocket 394 is a component of a timing mechanism 398 for the rear bank BR, and functions to transmit a rotational drive force of the crankshaft 336 to an intake camshaft 357 and an exhaust camshaft 358 in a valve operating device 348R for the rear bank BR (see FIG. 6) to be hereinafter described with the rotational speed of these camshafts 357 and 358 reduced to ½. An endless cam chain 399 is wrapped around the drive sprocket 394. Although not shown, driven sprockets are mounted on the intake and exhaust camshafts 357 and 358, and the cam chain 399 is wrapped around these driven sprockets.

A primary speed reducing device 101 is provided at the right end portion of the crankshaft 336. The primary speed reducing device 101 has a primary drive gear 58a mounted on the crankshaft 336 at a position axially outside of the drive sprocket 394 (on the right side of the drive sprocket 394). The primary drive gear 58a is in mesh with a primary driven gear 58 (see FIG. 8) to be hereinafter described.

A generator 384 is connected to the left end portion of the crankshaft 336. The generator 384 is composed of a rotor 385 fixed to the crankshaft 336 and a stator 386 fixedly provided in the rotor 385. The generator 384 is accommodated in a generator accommodating chamber 388 formed inside a generator cover 387. The stator 386 is fixed to the generator cover 387. A one-way clutch 389 is connected to the rotor 386, and a gear 390 is connected to the one-way clutch 389. A starter motor (not shown) is connected to the gear 390.

Figure 6:
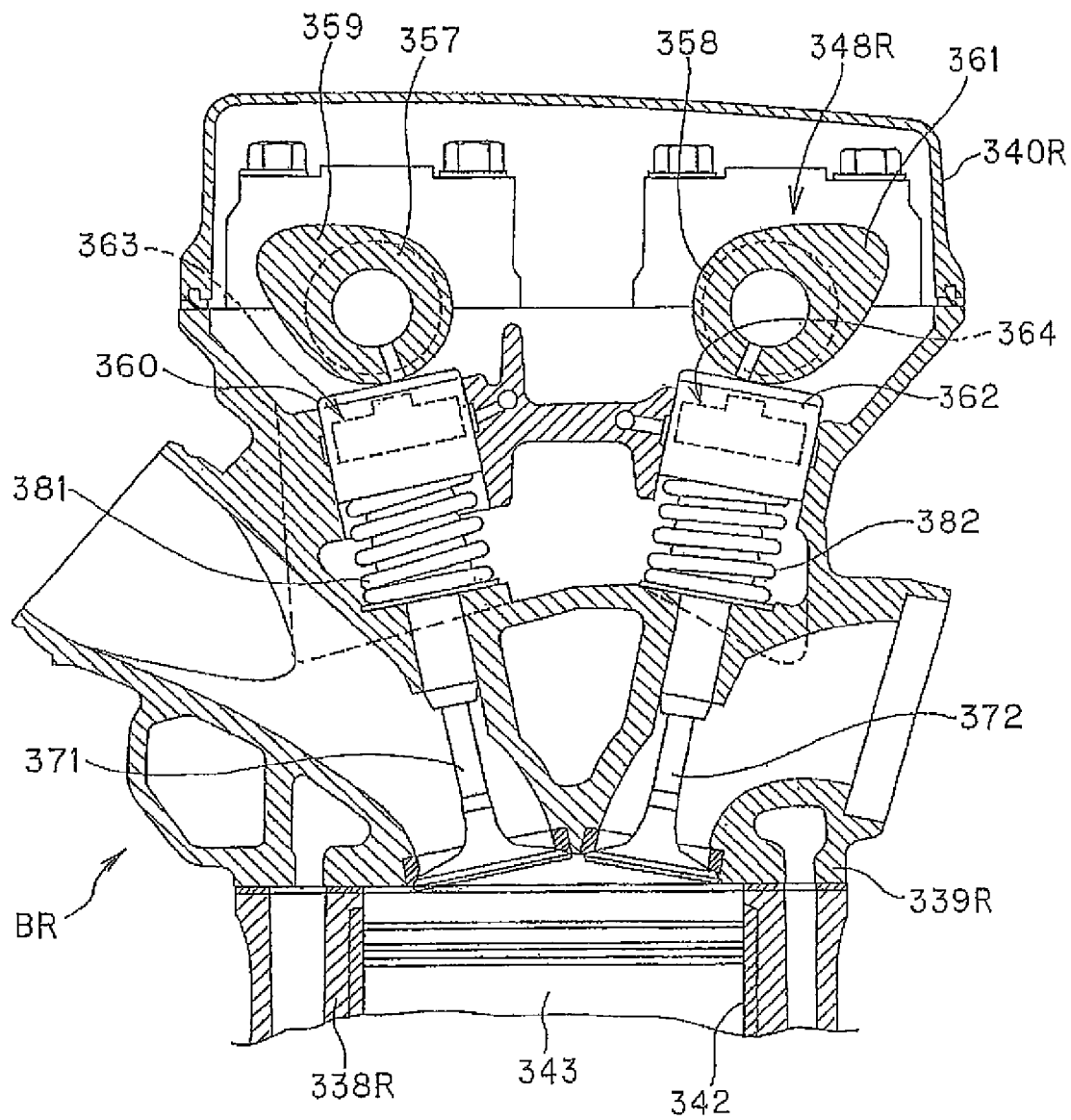
FIG. 6 is a sectional view similar to FIG. 5, showing a valve operating device in a rear bank.

FIG. 6 is a sectional view similar to FIG. 5, showing the valve operating device 348R for the rear bank BR.

As shown in FIG. 6, the rear cylinder head 339R is provided with two intake valves 371 and two exhaust valves 372 in each cylinder bore 342. Each intake valve 371 is operatively supported in the rear cylinder head 339R so as to be normally biased in a valve closing direction by a valve spring 381. Similarly, each exhaust valve 372 is operatively supported in the rear cylinder head 339R so as to be normally biased in a valve closing direction by a valve spring 382. Each intake valve 371 and each exhaust valve 372 are driven by the valve operating device 348R for the rear bank BR.

The valve operating device 348R for the rear bank BR is of a twin cam type having an intake camshaft 357 and an exhaust camshaft 358 each having an axis parallel to the axis of the crankshaft 336 and rotatably supported to the rear cylinder head 339R.

The intake camshaft 357 is located above the intake valves 371, and the exhaust camshaft 358 is located above the exhaust valves 372. The intake camshaft 357 is formed with a plurality of (four in this preferred embodiment) intake cams 359, and the exhaust camshaft 358 is formed with a plurality of (four in this preferred embodiment) exhaust cams 361. An intake valve lifter 360 is in contact with each intake cam 359. The intake valve lifter 360 is provided at the upper end of each intake valve 371 so as to be slidably fitted to the rear cylinder head 339R. Similarly, an exhaust valve lifter 362 is in contact with each exhaust cam 361. The exhaust valve lifter 362 is provided at the upper end of each exhaust valve 372 so as to be slidably fitted to the rear cylinder head 339R. The valve operating device 348R for the rear bank BR further includes an intake valve operation mode switching mechanism 363 for switching between an operative mode and an inoperative mode (valve closed condition) of each intake valve 371 and an exhaust valve operation mode switching mechanism 364 for switching between an operative mode and an inoperative mode (valve closed condition) of each exhaust valve 372. The intake camshaft 357 and the exhaust camshaft 358 are driven by the endless cam chain 399 (see FIG. 4).

Figure 7:
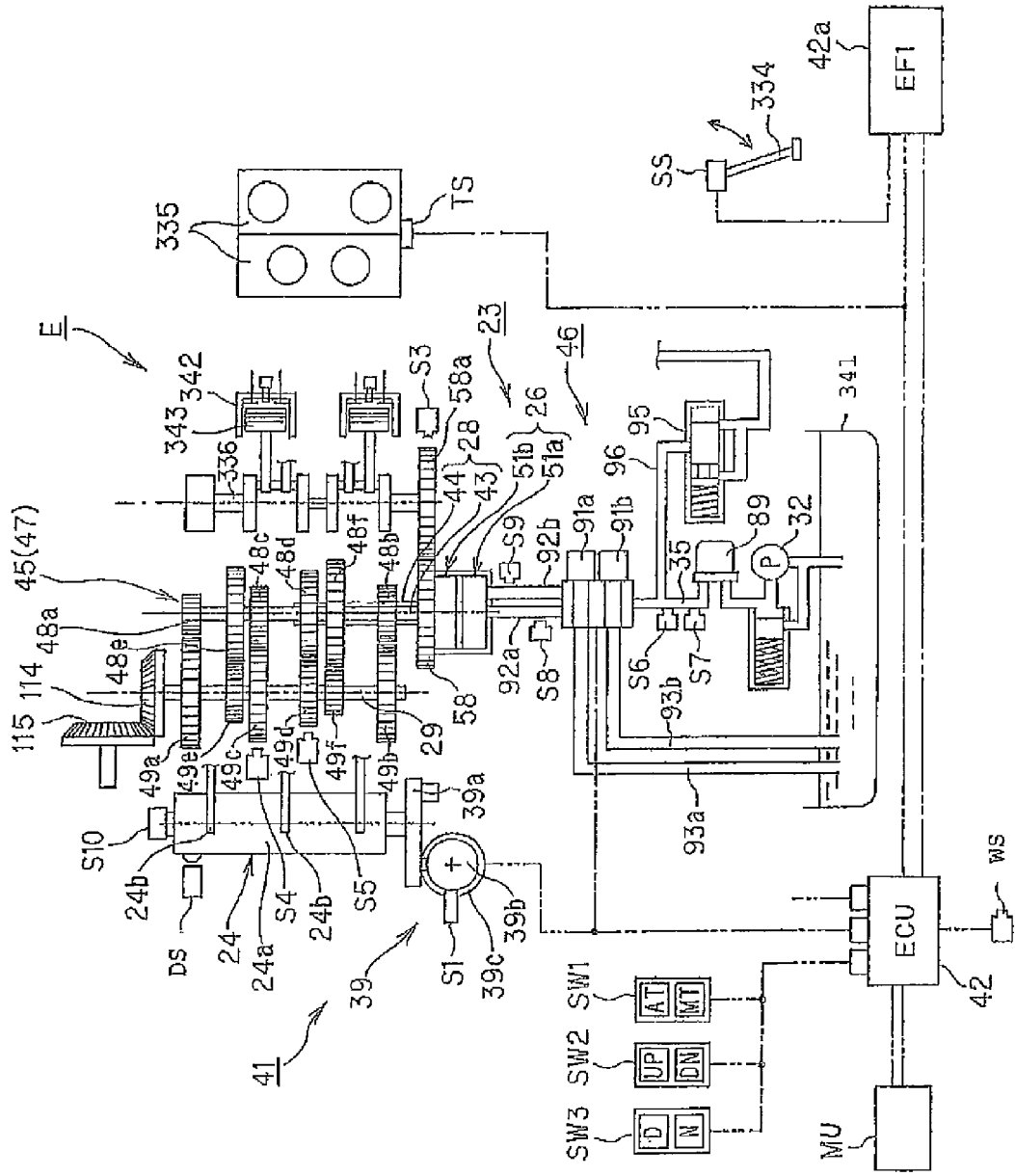
FIG. 7 is a schematic diagram showing the configuration of a hydraulic system.

The transmission M will now be described. As shown in FIG. 7, the transmission M is a twin clutch type transmission, and the motorcycle 1 is provided with a twin clutch type shift control device mainly including a twin clutch type transmission 23 connected to the engine E, a gear shift device 41 having a change mechanism 24 and a drive mechanism 39, and an electronic control unit (ECU) 42 for controlling the operations of the twin clutch type transmission 23 and the gear shift device 41.

Figure 8:
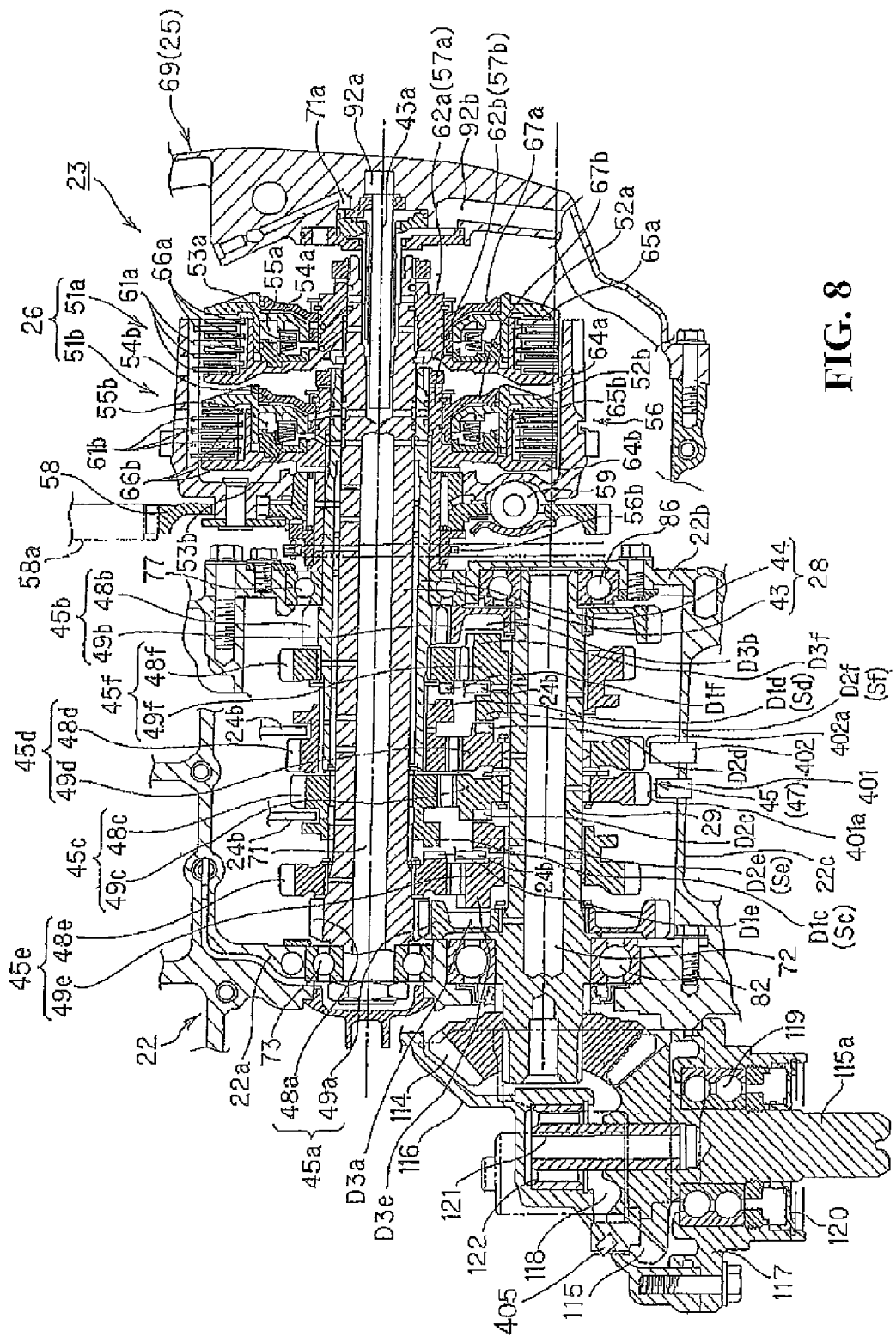
FIG. 8 is a sectional view of a gear shift mechanism and a clutch device.

Referring also to FIG. 8, the twin clutch type transmission 23 includes a main shaft 28 having a double structure composed of an inner shaft 43 and an outer shaft 44 with a counter shaft 29 extending parallel to the main shaft 28. A shift gear group 45 is provided between the main shaft 28 and the counter shaft 29 with a twin clutch 26 being coaxially provided on the main shaft 28 at its right end portion. An oil pressure supply device 46 is provided for supplying a working oil pressure to the twin clutch 26. The assembly of the main shaft 28, the counter shaft 29, and the shift gear group 45 will be hereinafter referred to as a transmission 47.

As shown in FIG. 8, the main shaft 28 is configured so that the inner shaft 43 extends across a transmission case 22 forming a part of the crankcase 335 in the lateral direction of the vehicle and that the right portion of the inner shaft 43 is relatively rotatably inserted through the outer shaft 44. The inner shaft 43 is rotatably supported through bearings (not shown) to the outer shaft 44. A plurality of (six in this preferred embodiment) drive gears 48a to 48f for six shift positions in the shift gear group 45 are divisionally arranged on the outer circumferential surfaces of the inner and outer shafts 43 and 44. On the other hand, a plurality of (six in this preferred embodiment) driven gears 49a to 49f for six shift positions in the shift gear group 45 are arranged on the outer circumferential surface of the counter shaft 29. The drive gears 48a to 48f are in mesh with the driven gears 49a to 49f, respectively, thereby forming six shift gear pairs 45a to 45f respectively corresponding to the first to sixth shift positions. The shift gear pairs 45a to 45f have speed reduction ratios decreasing in this order (i.e., the output rotational speed becomes higher in this order).

The left end portion of the inner shaft 43 is rotatably supported through a ball bearing 73 to a left side wall 22a of the transmission case 22. The right portion of the inner shaft 43 extends through a right side wall 22b of the transmission case 22 into a clutch accommodating chamber 25. The intermediate portion of the inner shaft 43 is rotatably supported through the intermediate portion of the outer shaft 44 and a ball bearing 77 to the right side wall 22b of the transmission case 22. The intermediate portion of the outer shaft 44 extends through the right side wall 22b of the transmission case 22 and is rotatably supported through the ball bearing 77 to the right side wall 22b.

The outer shaft 44 is shorter than the inner shaft 43, and the left end portion of the outer shaft 44 is terminated at the laterally central position in the transmission case 22. The drive gears 48b, 48d, and 48f respectively corresponding to the second, fourth, and sixth shift positions (even-numbered shift positions) in the shift gear group 45 are supported to the left portion of the outer shaft 44 located on the left side of the right side wall 22b. These drive gears 48b, 48d, and 48f are arranged in the order of 48d (the fourth shift position), 48f (the sixth shift position), and 48b (the second shift position) from the left end of the outer shaft 44. On the other hand, the drive gears 48a, 48c, and 48e respectively corresponding to the first, third, and fifth shift positions (odd-numbered shift positions) in the shift gear group 45 are supported to the left portion of the inner shaft 43 located on the left side of the left end of the outer shaft 44. These drive gears 48a, 48c, and 48e are arranged in the order of 48a (the first shift position), 48e (the fifth shift position), and 48c (the third shift position) from the left end of the inner shaft 43.

The left and right end portions of the counter shaft 29 are rotatably supported through ball bearings 82 and 86 to the left and right side walls 22a and 22b of the transmission case 22, respectively.

The left end portion of the counter shaft 29 projects to the left from the left side wall 22a. A drive bevel gear 114 is fixed to the projecting left end portion of the counter shaft 29. A driven bevel gear 115 having a rotation axis extending in the longitudinal direction of the motorcycle 1 is in mesh with the drive bevel gear 114. The drive bevel gear 114 and the driven bevel gear 115 meshing with each other are accommodated in a gear chamber 118 defined inside a first gear cover 116. A second gear cover 117 is detachably connected to the first gear cover 116 by bolts. One end of a support shaft 121 is engaged with the driven bevel gear 115, and the other end of the support shaft 121 is rotatably supported through a roller bearing 122 in a boss of the first gear cover 116. The driven bevel gear 115 is coaxially formed with a shaft portion 115a. The shaft portion 115a is rotatably supported through a ball bearing 119 to the second gear cover 117. The shaft portion 115a projects rearward from the second gear cover 117 and is connected to the drive shaft 332 (see FIG. 1). The first gear cover 116 is provided with a vehicle speed sensor 405 opposed to the driven bevel gear 115. The vehicle speed sensor 405 functions to detect the rotational speed of the driven bevel gear 115, thereby obtaining a vehicle speed.

The driven gears 49a to 49f in the shift gear group 45 are supported to the counter shaft 29 at its portion located inside of the transmission case 22. These driven gears 49a to 49f are arranged in the axial direction of the counter shaft 29 in the same order as that of the drive gears 48a to 48f mentioned above.

The main shaft 28 (the inner shaft 43) and the counter shaft 29 are respectively formed with main oil passages 71 and 72 for supplying an oil pressure from a main oil pump (not shown) for lubrication of the engine E. Accordingly, engine oil from the main oil pump is also supplied through the main oil passages 71 and 72 to the shift gear group 45.

The twin clutch 26 is coaxially mounted on the main shaft 28 at its right end portion. The twin clutch 26 has first and second hydraulic disk clutches (which will be hereinafter referred to also simply as clutches) 51a and 51b coaxially juxtaposed to each other. The inner and outer shafts 43 and 44 are coaxially connected to the first and second clutches 51a and 51b, respectively. These clutches 51a and 51b have a common clutch outer 56. The primary driven gear 58 meshing with the primary drive gear 58a of the crankshaft 336 is coaxially connected to the clutch outer 56, so that a rotational drive force from the crankshaft 336 is input through these gears 58a and 58 to the clutch outer 56. The rotational drive force thus input to the clutch outer 56 is transmitted separately to the inner and outer shafts 43 and 44 according to the engaged/disengaged conditions of the clutches 51a and 51b.

As described later in detail, the engaged/disengaged conditions of the clutches 51a and 51b are separately controlled according to whether or not the oil pressure from the oil pressure supply device 46 is supplied to these clutches 51a and 51b.

In the condition where one of the clutches 51a and 51b is engaged and the other is disengaged, any one of the shift gear pairs connected to one of the inner and outer shafts 43 and 44 is used to perform the transmission of power in the transmission 47. Further, any one of the shift gear pairs connected to the other of the inner and outer shafts 43 and 44 is preliminarily selected for the next use. Thereafter, one of the clutches 51a and 51b in the engaged condition is disengaged and the other of the clutches 51a and 51b in the disengaged condition is engaged, so that the shift gear pair preliminarily selected above is now used to perform the transmission of power in the transmission 47, thereby effecting upshift or downshift in the transmission 47.

As shown in FIG. 7, the oil pressure supply device 46 includes a clutch oil pump 32 as an oil pressure source for the twin clutch 26, a feed oil passage 35 extending from a discharge port of the clutch oil pump 32, first and second clutch actuators 91a and 91b connected to a downstream end of the feed oil passage 35, and first and second oil passages 92a and 92b respectively extending from the first and second clutch actuators 91a and 91b to engaging oil pressure chambers 54a and 54b (see FIG. 8) defined in the clutches 51a and 51b.

The clutch oil pump 32 is provided independently of the main oil pump for lubrication of the engine E, and functions to pump up the engine oil stored in the oil pan 341 below the crankcase 335 (see FIG. 2) and discharge the engine oil into the feed oil passage 35. The feed oil passage 35 is provided with an oil filter 89 dedicated to this oil passage 35. In FIG. 7, an oil pressure sensor S6 is provided for detecting an oil pressure in the feed oil passage 35 and an oil temperature sensor S7 is provided for detecting an oil temperature in the feed oil passage 35. A relief valve R is provided for controlling a rise in oil pressure in the feed oil passage 35. Oil pressure sensors S8 and S9 are provided for detecting oil pressures in the oil passages 92a and 92b, i.e., oil pressures supplied to the clutches 51a and 51b, respectively.

The feed oil passage 35 can be brought into communication with the first and second oil passages 92a and 92b independently of each other by the operation of the clutch actuators 91a and 91b. When the feed oil passage 35 is brought into communication with the first oil passage 92a through the first clutch actuator 91a, a relatively high oil pressure from the clutch oil pump 32 is supplied through the first oil passage 92a to the engaging oil pressure chamber 54b of the second clutch 51b, thereby engaging the second clutch 51b. Conversely, when the feed oil passage 35 is brought into communication with the second oil passage 92b through the second clutch actuator 91b, the oil pressure from the clutch oil pump 32 is supplied through the second oil passage 92b to the engaging oil pressure chamber 54a of the first clutch 51a, thereby engaging the first clutch 51a.

An oil pressure relief passage 96 having an oil pressure relief valve 95 is branched from the feed oil passage 35. The oil pressure relief valve 95 is operated by a valve actuator 95a to switch between an open condition and closed condition of the oil pressure relief passage 96. The valve actuator 95a is controlled by the electronic control unit 42. For example, at the starting the engine E, the oil pressure relief passage 96 is opened to return the feed oil pressure from the clutch oil pump 32 to the oil pan 341, and after starting the engine E, the oil pressure relief passage 96 is closed to supply the feed oil pressure from the clutch oil pump 32 to the twin clutch 26. The clutch actuators 91a and 91b are respectively provided with return passages 93a and 93b for returning the oil pressure from the clutch oil pump 32 to the oil pan 341 when the communication between the feed oil passage 35 and the first and second oil passages 92a and 92b is interrupted.

Figure 10:
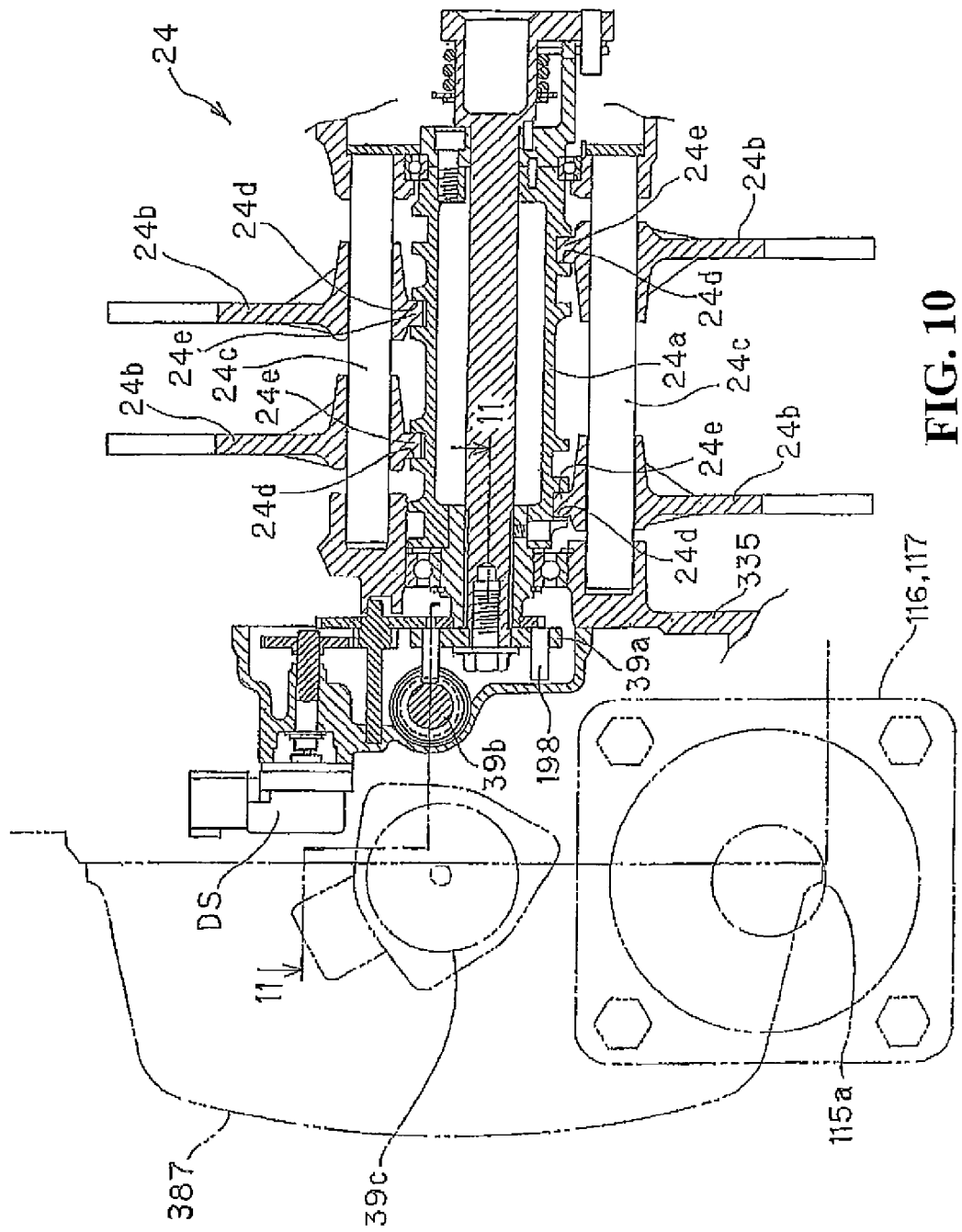
FIG. 10 is an enlarged cross section taken along the line 10-10 in FIG. 2.

As shown in FIGS. 7 and 10, the change mechanism 24 constituting the gear shift device 41 includes a shift drum 24a extending parallel to the main shaft 28 and the counter shaft 29 and a plurality of (four in this preferred embodiment) shift forks 24b axially movable by rotating the shift drum 24a. By the axial movement of the shift forks 24b, the shift gear pairs (shift positions) used for the power transmission between the main shaft 28 and the counter shaft 29 can be changed.

Two of these four shift forks 24b extend toward the main shaft 28, and the other two extend toward the counter shaft 29. These four shift forks 24b are supported at their base end portions to a pair of shift fork rods 24c so as to be movable in the axial direction thereof. The base end portion of each shift fork 24b is formed with a sliding projection 24e engaging with any one of a plurality of cam grooves 24d formed on the outer circumferential surface of the shift drum 24a. The front end portion (forked end portion) of each shift fork 24b is engaged with a slide gear in the shift gear group 45 to be hereinafter described. When the shift drum 24a is rotated, one of the shift forks 24b is axially moved according to the pattern of the corresponding cam groove 24d, thereby axially moving the corresponding slide gear to change the shift position in the transmission 47.

The drive mechanism 39 constituting the gear shift device 41 is provided at one end of the shift drum 24a. The drive mechanism 39 includes a pin gear 39a coaxially fixed to the shift drum 24a of the change mechanism 24, a worm-like barrel cam 39b engaged with the pin gear 39a, and an electric motor 39c for applying a rotational drive force to the barrel cam 39b. Accordingly, the shift drum 24a is suitably rotated by driving the electric motor 39c, thus changing the shift position in the transmission 47.

The electric motor 39c is mounted on one side surface of the crankcase 335. For example, in the mounted condition of the engine body 333 to the body frame F, the electric motor 39c is mounted on the left or right side surface of the crankcase 335, e.g., on the left side surface of the crankcase 335 and is located on the rear side of the generator cover 387.

In FIG. 7, a sensor S1 is provided for detecting an operational amount of the drive mechanism 39 to thereby detect the shift position in the transmission 47. A rotational angle sensor DS is provided for detecting an actual rotational angle of the shift drum 24a.

Figure 11:
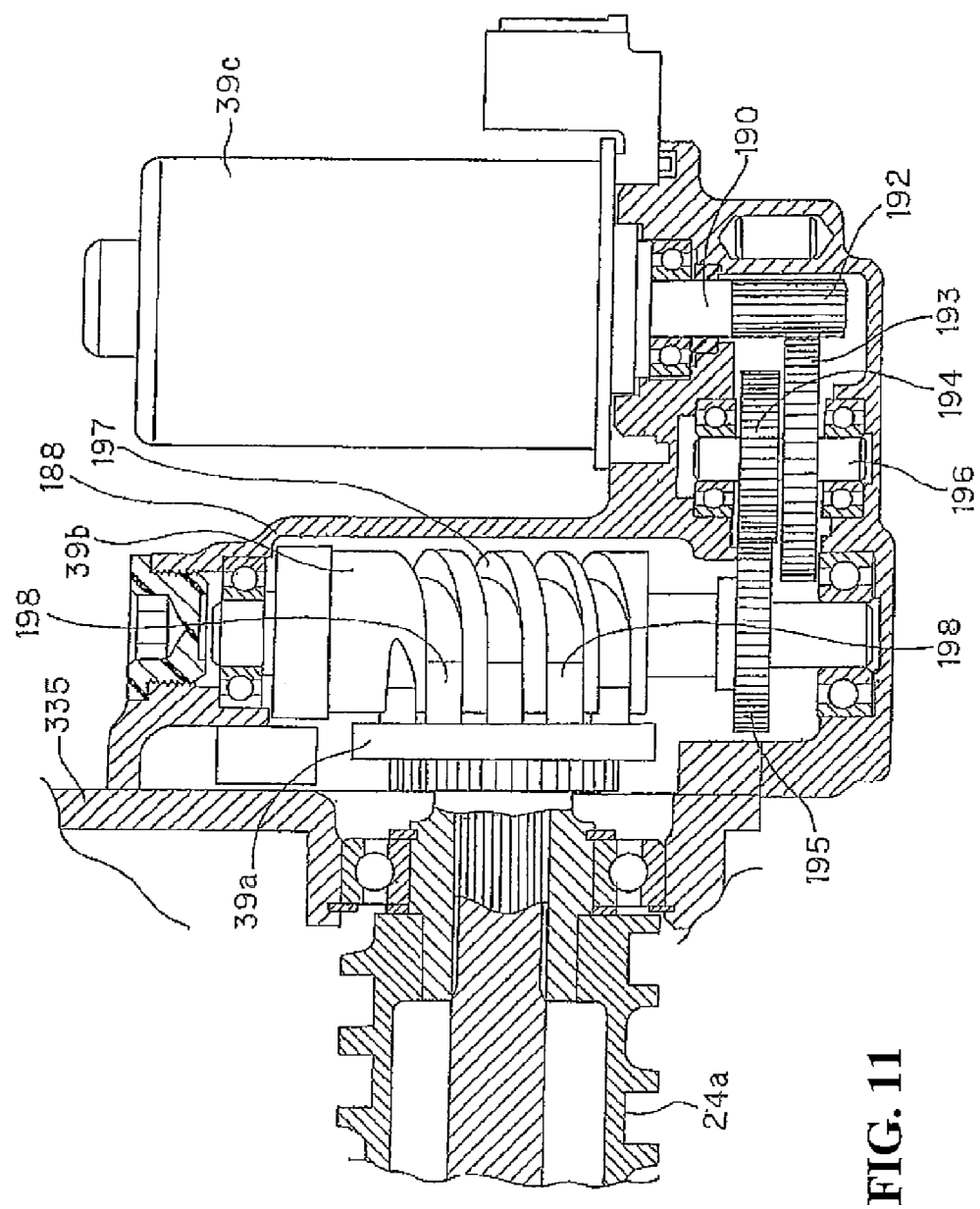
FIG. 11 is a cross section taken along the line 11-11 in FIG. 10.

As shown in FIG. 11, a case member 188 is fastened to the crankcase 335, and the electric motor 39c is fixed to the case member 188. A motor shaft 190 of the electric motor 39c is formed with a drive gear 192. A first intermediate gear 193 is in mesh with the drive gear 192. The first intermediate gear 193 is supported to a rotating shaft 196. A second intermediate gear 194 is also supported to the rotating shaft 196 so as to be axially juxtaposed to the first intermediate gear 193. The second intermediate gear 194 is in mesh with a driven gear 195. The driven gear 195 is fixed to the barrel cam 39b. Accordingly, the bane cam 39b is rotationally driven by a drive force output from the electric motor 39c through the above gears 192, 193, 194, and 195. A spiral cam groove 197 is formed on the outer circumference of the barrel cam 39b, and a plurality of pins 198 fixed to the pin gear 39a are in mesh with the cam groove 197. These pins 198 of the pin gear 39a sequentially come into mesh with the cam groove 197 according to the rotation of the barrel cam 39b, thereby transmitting a rotational drive force from the barrel cam 39b to the pin gear 39a.

As shown in FIG. 8, the transmission 47 is of a constant-mesh type such that the drive gears 48a to 48f are always in mesh with the driven gears 49a to 49f, respectively. The drive gears 48a to 48f and the driven gears 49a to 49f are generally classified into fixed gears rotatable integrally with their support shafts (the shafts 28 and 29), free gears rotatable relative to their support shafts and axially movable, and slide gears rotatable integrally with their support shafts and axially movable.

More specifically, the drive gears 48a and 48b are fixed gears, the drive gears 48c and 48d are slide gears, and the drive gears 48e and 48f are free gears. On the other hand, the driven gears 49a to 49d are free gears, and the driven gears 49e and 49f are slide gears. The gears 48c, 48d, 49e, and 49f will be hereinafter referred to as slide gears, and the gears 48e, 48f, and 49a to 49d will be hereinafter referred to as free gears. By suitably sliding (axially moving) any arbitrary one of the slide gears 48c, 48d, 49e, and 49f by the operation of the change mechanism 24, the shift position in the transmission 47 can be changed to another shift position.

The slide gear 48c is integrally formed with a slide ring Sc on one side of the slide gear 48c, so that the slide ring Sc is rotatable integrally with its support shaft (the main shaft 28) and axially movable. Similarly, the slide gear 48d is integrally formed with a slide ring Sd on one side of the slide gear 48d, so that the slide ring Sd is rotatable integrally with its support shaft (the main shaft 28) and axially movable. These slide rings Sc and Sd are axially juxtaposed to the flee gears 48e and 48f, respectively. The slide rings Sc and Sd are formed with dogs (dowels) D1c and D1d, respectively, and the free gears 48e and 48f are formed with dogs (dowels) D1e and D1f respectively. The dogs D1c and D1d are engageable with the dogs D1e and D1f respectively.

Further, the slide gear 49e is integrally formed with a slide ring Se on one side of the slide gear 49e, so that the slide ring Se is rotatable integrally with its support shaft (the counter shaft 29) and axially movable. Similarly, the slide gear 49f is integrally formed with a slide ring Sf on one side of the slide gear 49f so that the slide ring Sf is rotatable integrally with its support shaft (the counter shaft 29) and is axially movable. These slide rings Se and Sf are axially juxtaposed to the free gears 49c and 49d, respectively. The slide rings Se and Sf are formed with dogs (dowels) D2e and D2f, respectively, and the free gears 49c and 49d are formed with dogs (dowels) D2c and D2d, respectively. The dogs D2e and D2f are engageable with the dogs D2c and D2d, respectively.

Further, the slide gear 49e is farther formed with a dog (dowel) D3e on the other side of the slide gear 49e, and the slide gear 49f is further formed with a dog (dowel) D3f on the other side of the slide gear 49f. On the other hand, the free gear 49a axially juxtaposed to the slide gear 49e is formed with a dog (dowel) D3a engageable with the dog D3e of the slide gear 49e. Similarly, the free gear 49b axially juxtaposed to the slide gear 49f is formed with a dog (dowel) D3b engageable with the dog D3f of the slide gear 49f.

When each slide gear (including each slide ring) is moved toward its adjacent free gear, the dogs of these slide gear and free gear are brought into relatively nonrotatable engagement with each other. Conversely, when the slide gear and free gear are moved away from each other, the respective dogs are disengaged from each other. Thus, any one of the shift positions can be selected by sliding any one of the slide gears. In the condition where all of the slide gears are disengaged from the corresponding free gears as shown in FIG. 8, the transmission of power between the shafts 28 and 29 is not allowed. This condition is a neutral condition of the transmission 47.

As shown in FIG. 7, the electronic control unit 42 controls the operations of the twin clutch type transmission 23 and the gear shift device 41 to change the shift position in the transmission 47 according to information from the sensors mentioned above and information from a throttle sensor TS for detecting a throttle angle of a throttle valve in each throttle body, a retraction sensor (switch) SS for detecting a retracted condition of the side stand 334 (or a center stand), a wheel speed sensor WS for detecting a rotational speed of the front wheel 2, a mode switch SW1 provided on the steering handle 325a for selecting a shift mode, a gear select switch SW2 for effecting a manual shift, and a neutral/drive select switch SW3 for selecting a neutral condition or a drive condition.

The shift mode to be selected by the mode switch SW1 includes a full-automatic mode such that the shift position in the transmission 47 is automatically changed according to various pieces of vehicle information such as a vehicle speed (wheel speed) and an engine speed and a semiautomatic mode such that the shift position in the transmission 47 is changed by the operation of only the gear select switch SW2 according to the intention of the operator. The present shift mode and the present shift position are displayed on a meter unit MU provided in the vicinity of the steering handle 325a. Further, by the operation of the neutral/drive select switch SW3, it is possible to switch between the neutral condition and the drive condition where the transmission of power is allowed at a desired shift position in the transmission 47. In FIG. 7, a rotation sensor S3 is provided for detecting a rotational speed of the primary drive gear 58a to thereby detect an engine speed (a rotational speed of the crankshaft 336). Various pieces of information from the sensors mentioned above are shared between the electronic control unit 42 and an ECU 42a for a fuel injection device.

Figure 9:
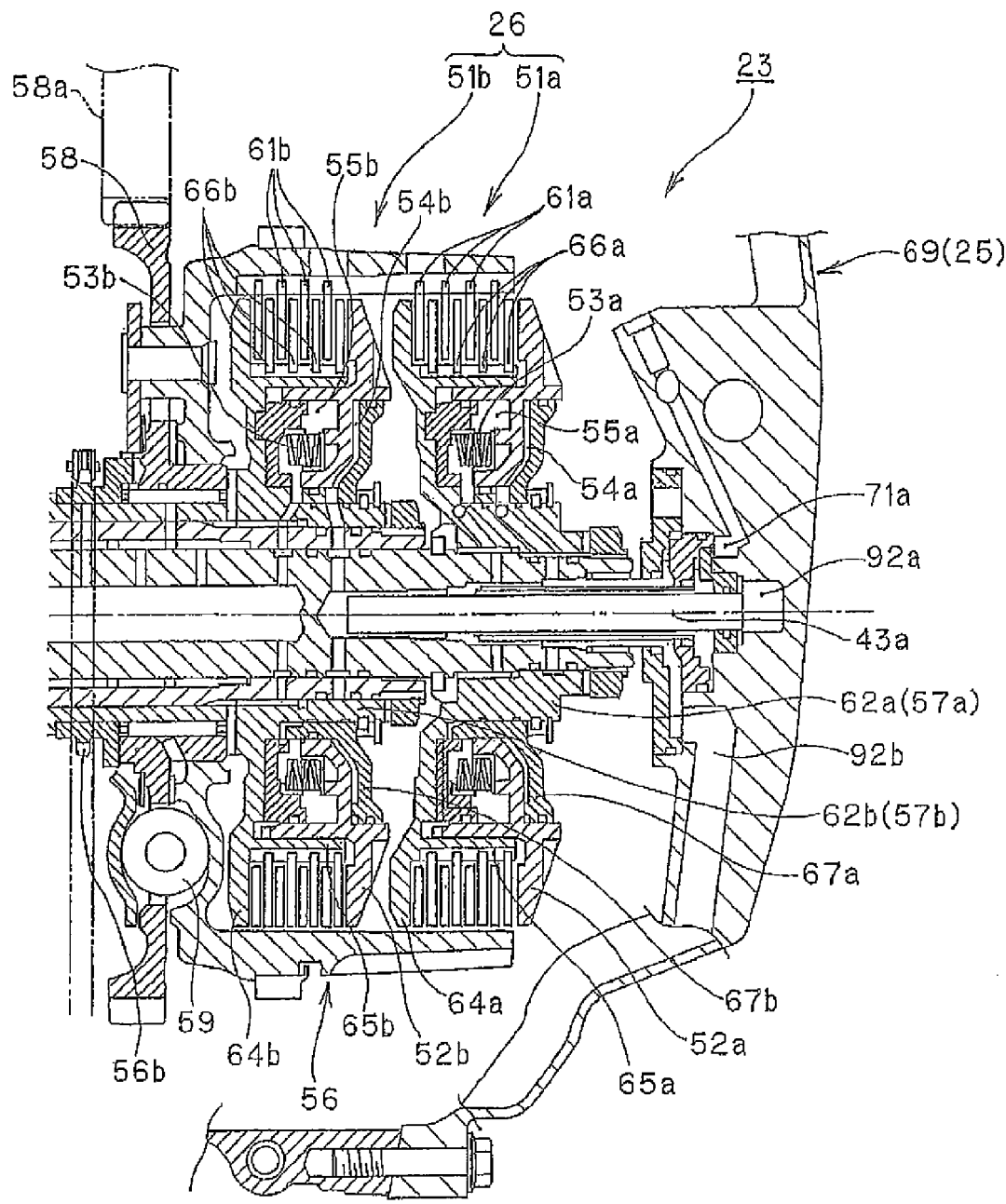
FIG. 9 is an enlarged view of an essential part in FIG. 8.

As shown in FIG. 9, the twin clutch 26 includes the first clutch 51a located on the right side (laterally outside) in the clutch accommodating chamber 25 and the second clutch 51b located on the left side (laterally inside) in the clutch accommodating chamber 25. The first clutch 51a is connected to the shift gear pairs for the odd-numbered shift positions, and the second clutch 51b is connected to the shift gear pairs for the even-numbered shift positions. Each of the first and second clutches 51a and 51b is a wet type multidisc clutch having a plurality of clutch discs and a plurality of clutch plates alternately arranged in the axial direction. More specifically, the first clutch 51a includes the clutch discs 61a and the clutch plates 66a alternately arranged in the axial direction, and the second clutch 51b includes the clutch discs 61b and the clutch plates 66b alternately arranged in the axial direction.

The first clutch 51a further includes a pressure plate 52a adapted to be axially displaced by oil pressure supplied from the outside of the first clutch 51a, thereby obtaining a predetermined engaging force, a return spring 53a for biasing the pressure plate 52a in a clutch disengaging direction, an engaging oil pressure chamber 54a for applying an oil pressure to the pressure plate 52a in a clutch engaging direction, and a disengaging oil pressure chamber 55a for applying an oil pressure to the pressure plate 52a in the clutch disengaging direction to assist the return operation of the pressure plate 52a. Similarly, the second clutch 51b further includes a pressure plate 52b adapted to be axially displaced by oil pressure supplied from the outside of the second clutch 51b, thereby obtaining a predetermined engaging force, a return spring 53b for biasing the pressure plate 52b in a clutch disengaging direction, an engaging oil pressure chamber 54b for applying oil pressure to the pressure plate 52b in a clutch engaging direction, and a disengaging oil pressure chamber 55b for applying oil pressure to the pressure plate 52b in the clutch disengaging direction to assist the return operation of the pressure plate 52b. A relatively low oil pressure is always supplied from the main oil pump to the disengaging oil pressure chambers 55a and 55b, whereas a relatively high oil pressure is supplied from the oil pressure supply device 46 (the clutch oil pump 32) to the engaging oil pressure chambers 54a and 54b selectively and separately.

The clutches 51a and 51b have a common clutch outer 56 and accordingly have substantially the same diameter. The clutch outer 56 has a cylindrical shape with a bottom as a closed left end and with an open right end as viewed in FIG. 9. The center of the bottom of the clutch outer 56 is relatively rotatably supported to the axially intermediate portion of the outer shaft 44. A clutch center 57a for the first clutch 51a is located in the right inside area of the clutch outer 56, and a clutch center 57b for the second clutch 51b is located in the left side area of the clutch outer 56. The clutch center 57a is integrally rotatably supported to the right end portion of the inner shaft 43, and the clutch center 57b is integrally rotatably supported to the right end portion of the outer shaft 44.

The primary driven gear 58 is mounted on the left side of the bottom of the clutch outer 56 through a spring damper 59. The primary drive gear 58a of the crankshaft 336 is in mesh with the primary driven gear 58.

Accordingly, a rotational drive force from the crankshaft 336 is input through the spring damper 59 to the clutch outer 56. The clutch outer 56 is rotated independently of the main shaft 28 by the rotation of the crankshaft 336.

A drive sprocket 56b for driving each oil pump is integrally rotatably mounted on the left side of the primary driven gear 58.

The plurality of clutch plates 61a for the first clutch 51a are integrally rotatably supported to the inner circumference of the clutch outer 56 at its right portion, and the plurality of clutch plates 61b for the second clutch 51b are integrally rotatably supported to the inner circumference of the clutch outer 56 at its left portion. More specifically, a plurality of axially extending grooves are formed on the inner circumference of the clutch outer 56, and a plurality of projections respectively corresponding to the plural grooves of the clutch outer 56 are formed on the outer circumference of each of the clutch plates 61a and 61b. These projections of each of the clutch plates 61a and 61b are relatively nonrotatably engaged with the grooves of the clutch outer 56, thus integrally rotatably supporting the clutch plates 61a and 61b to the clutch outer 56.

The clutch center 57a for the first clutch 51a is formed with a left flange portion 64a. The left flange portion 64a is formed with a rightward projecting inner wall portion 65a. The plurality of clutch discs (friction plates) 66a are integrally rotatably supported to the outer circumference of the inner wall portion 65a. More specifically, a plurality of axially extending grooves are formed on the outer circumference of the inner wall portion 65a of the clutch center 57a, and a plurality of projections respectively corresponding to the plurality of grooves of the inner wall portion 65a are formed on the inner circumference of each of the clutch discs 66a. These projections of each clutch disc 66a are relatively nonrotatably engaged with the grooves of the inner wall portion 65a, thus integrally rotatably supporting the clutch discs 66a to the clutch center 57a.

The pressure plate 52a is opposed to the right side of the flange portion 64a. The clutch plates 61a and the clutch discs 66a are alternately arranged in the axial direction in a stacked condition between the outer circumferential portion of the pressure plate 52a and the outer circumferential portion of the flange portion 64a.

The disengaging oil pressure chamber 55a is defined between the inner circumferential portion of the pressure plate 52a and the inner circumferential portion of the flange portion 64a. The return spring 53a is located in the disengaging oil pressure chamber 55a to bias the pressure plate 52a to the right (in the direction of displacing the pressure plate 52a away from the flange portion 64a, i.e., in the clutch disengaging direction). A support flange 67a is opposed to the right side of the inner circumferential portion of the pressure plate 52a. The support flange 67a is mounted on the outer circumference of a central cylindrical portion 62a of the clutch center 57a. The engaging oil pressure chamber 54a is defined between the support flange 67a and the inner circumferential portion of the pressure plate 52a.

Similarly, the clutch center 57b for the second clutch 51b is formed with a left flange portion 64b. The left flange portion 64b is formed with a rightward projecting inner wall portion 65b. The plurality of clutch discs (friction plates) 66b are integrally rotatably supported to the outer circumference of the inner wall portion 65b. More specifically, a plurality of axially extending grooves are formed on the outer circumference of the inner wall portion 65b of the clutch center 57b, and a plurality of projections respectively corresponding to the plurality of grooves of the inner wall portion 65b are formed on the inner circumference of each of the clutch discs 66b. These projections of each clutch disc 66b are relatively nonrotatably engaged with the grooves of the inner wall portion 65b, thus integrally rotatably supporting the clutch discs 66b to the clutch center 57b.

The pressure plate 52b is opposed to the right side of the flange portion 64b. The clutch plates 61b and the clutch discs 66b are alternately arranged in the axial direction in a stacked condition between the outer circumferential portion of the pressure plate 52b and the outer circumferential portion of the flange portion 64b.

The disengaging oil pressure chamber 55b is defined between the inner circumferential portion of the pressure plate 52b and the inner circumferential portion of the flange portion 64b. The return spring 53b is located in the disengaging oil pressure chamber 55b to bias the pressure plate 52b to the right (in the direction of displacing the pressure plate 52b away from the flange portion 64b, i.e., in the clutch disengaging direction). A support flange 67b is opposed to the right side of the inner circumferential portion of the pressure plate 52b. The support flange 67b is mounted on the outer circumference of a central cylindrical portion 62b of the clutch center 57b. The engaging oil pressure chamber 54b is defined between the support flange 67b and the inner circumferential portion of the pressure plate 52b.

The right side wall of the clutch accommodating chamber 25 is formed by a clutch cover 69. The clutch cover 69 is formed with a first oil passage 92a, a second oil passage 92b, and a third oil passage 92c. The inner shaft 43 has an axially extending hollow portion 43a suitably formed with oil passages separately communicating with the oil passages 92a, 92b, and 92c.

The oil pressure from the clutch oil pump 32 is adapted to be supplied through the first oil passage 92a to the engaging oil pressure chamber 54b of the second clutch 51b. The oil pressure from the main oil pump is adapted to be supplied through the third oil passage 92c to the disengaging oil pressure chamber 55a of the first clutch 51a. The oil pressure from the clutch oil pump 32 is adapted to be supplied through the second oil passage 92b to the engaging oil pressure chamber 54a of the first clutch 51a. The oil pressure from the main oil pump is adapted to be supplied through the third oil passage 92c to the disengaging oil pressure chamber 55b of the second clutch 51b.

In the rest condition of the engine (the rest condition of each oil pump), the clutches 51a and 51b are in their disengaged condition where the pressure plates 52a and 52b are displaced to the right by the biasing forces of the return springs 53a and 53b, so that the friction engagement of the clutch plates 61a and 61b and the clutch discs 66a and 66b is canceled. Further, also in the condition where the engine is operating and the supply of oil pressure from the oil pressure supply device 46 is stopped, the biasing forces of the return springs 53a and 53b and the oil pressures in the disengaging oil pressure chambers 55a and 55b are applied to the pressure plates 52a and 52b, thereby obtaining the disengaged condition of the clutches 51a and 51b.

In the condition where the engine is operating and the relatively high oil pressure is supplied from the oil pressure supply device 46 to the engaging oil pressure chamber 54a in the first clutch 51a, the pressure plate 52a is moved to the left (in the direction moving toward the flange portion 64a, i.e., in the clutch engaging direction), so that the clutch plates 61a and the clutch discs 66a are pressed between the flange portion 64a and the pressure plate 52a to come into frictional engagement, thus obtaining the engaged condition of the first clutch 51a where torque can be transmitted between the clutch outer 56 and the clutch center 57a.

Similarly, in the condition where the engine is operating and the relatively high oil pressure is supplied from the oil pressure supply device 46 to the engaging oil pressure chamber 54b in the second clutch 51b, the pressure plate 52b is moved to the left (in the direction moving toward the flange portion 64b, i.e., in the clutch engaging direction), so that the clutch plates 61b and the clutch discs 66b are pressed between the flange portion 64b and the pressure plate 52b to come into frictional engagement, thus obtaining the engaged condition of the second clutch 51b where torque can be transmitted between the clutch outer 56 and the clutch center 57b.

When the supply of oil pressures from the oil pressure supply device 46 to the engaging oil pressure chambers 54a and 54b in the engaged condition of the clutches 51a and 51b is stopped, the pressure plates 52a and 52b are displaced to the right by the oil pressures in the disengaging oil pressure chambers 55a and 55b and the biasing forces of the return springs 53a and 53b, so that the frictional engagement of the clutch plates 61a and 61b and the clutch discs 66a and 66b is canceled, thus obtaining the disengaged condition of the clutches 51a and 51b where torque cannot be transmitted between the clutch outer 56 and the clutch centers 57a and 57b.

The engine oil supplied to the disengaging oil pressure chambers 55a and 55b of the clutches 51a and 51b is guided through oil passages suitably formed on the inner wall portions 65a and 65b to the outside of the oil pressure chambers 55a and 55b, and is supplied to the clutch plates 61a and 61b and the clutch discs 66a and 66b. Thus, the working oil in the disengaging oil pressure chambers 55a and 55b is relieved to maintain predetermined low oil pressures in the disengaging oil pressure chambers 55a and 55b. Further, the lubricating and cooling characteristics of the clutch plates 61a and 61b and the clutch discs 66a and 66b in the clutches 51a and 51b in their disengaged condition can be improved.

In the case when a rest condition of the motorcycle 1 is determined by the operated condition of the side stand even after starting the engine, both the clutches 51a and 51b are kept in their disengaged condition. When the side stand is retracted or the switches SW1, SW2, and SW3 are operated, the transmission 47 is changed from the neutral condition to the first shift position where the first-speed gears (starting gears, or the shift gear pair 45a) are used to allow the transmission of power as a start standby condition of the motorcycle 1. When the engine speed is increased from this first shift position, the first clutch 51a is changed through a partially engaged condition to a fully engaged condition, thereby starting the motorcycle 1.

During operation of the motorcycle 1, one of the clutches 51a and 51b corresponding to the present shift position is in the engaged condition and the other is kept disengaged. Thus, the transmission of power is performed by using one of the inner and outer shafts 43 and 44 and any one of the shift gear pairs 45a to 45f. In performing a shift change, the electronic control unit 42 operates to preliminarily generate a condition where the shift gear pair corresponding to the next shift position is used to allow the transmission of power according to vehicle information and to also control the operation of the twin clutch type transmission 23.

More specifically, in the case where the present shift position is an odd-numbered shift position (or an even-numbered shift position), the next shift position becomes an even-numbered shift position (or an odd-numbered shift position). Accordingly, the electronic control unit 42 preliminarily generates a condition where the shift gear pair corresponding to the even-numbered shift position (or the odd-numbered shift position) is used to allow the transmission of power. At this time, the first clutch 51a (or the second clutch 51b) is in the engaged condition and the second clutch 51b (or the first clutch 51a) is in the disengaged condition. Accordingly, the engine output (the rotational drive force from the crankshaft 336) is not transmitted to the outer shaft 44 (or the inner shaft 43) and the shift gear pair corresponding to the even-numbered shift position (or the odd-numbered shift position). Thereafter, when the electronic control unit 42 determines that a suitable shift timing is reached, the first clutch 51a (or the second clutch 51b) is disengaged and the second clutch 51b (or the first clutch 51a) is engaged to thereby obtain the condition where the shift gear pair corresponding to the next shift position preliminarily selected above is used to perform the transmission of power. Accordingly, it is possible to attain quick and smooth shifting without a time lag in shifting and interruption of the power transmission.

As shown in FIG. 8, rotation sensors 401 and 402 respectively having detecting portions 401a and 402a are mounted on a rear surface 22c of the transmission case 22 (corresponding to the rear surface of the crankcase) in such a manner that the detecting portions 401a and 402a are opposed to the teeth of the free gears (driven gears) 49c and 49d, respectively. The free gears 49c and 49d are located adjacent to each other near the center of the counter shaft 29 and are fixed in their axial position. The free gears 49c and 49d are provided on the counter shaft 29 behind the main shaft 28 and are in mesh with the drive gears 48c and 48d, respectively, both larger in diameter than the drive gear 48a having the smallest diameter in the drive gears 48a to 48f provided on the main shaft 28. Further, as mentioned above, the main shaft 28 has a double structure composed of the inner and outer shafts 43 and 44. The rotation sensor 401 is opposed to the teeth of the free gear 49c meshing with the drive gear 48c provided on the inner shaft 433 and the rotation sensor 402 is opposed to the teeth of the free gear 49d meshing with the drive gear 48d provided on the outer shaft 44.

The rotation sensors 401 and 402 respectively detect the rotational speeds of the free gears 49c and 49d provided on the counter shaft 29 rotatable with the rotation of the main shaft 28. Accordingly, the rotational speed of the main shaft 28 can be detected by the rotation sensors 401 and 402. By utilizing the detection of the rotational speed of the main shaft 28 in any vehicle having an automated shifting mechanism, a change in shift position can be accurately detected and the condition of automated shifting can be accurately grasped.

Figure 12A:
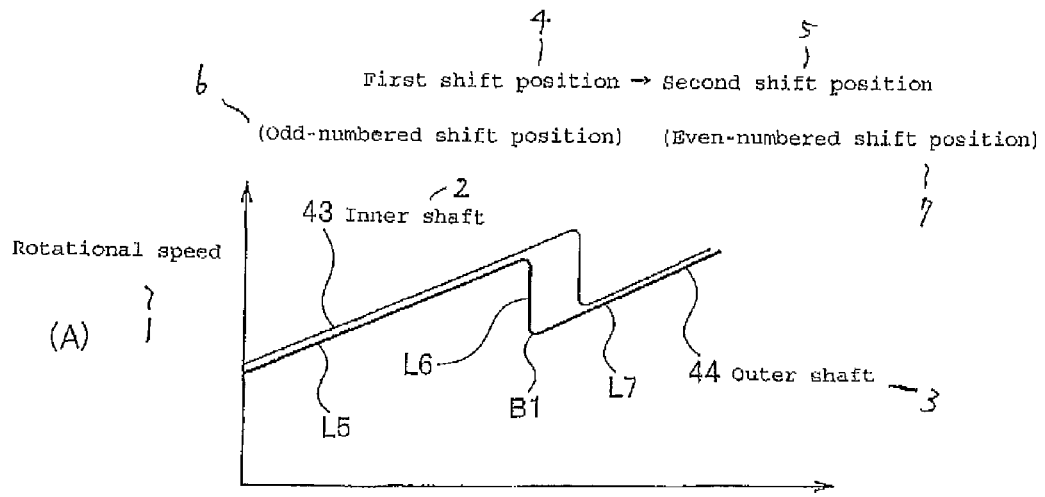
FIG. 12A is a graph showing a change in rotational speed of an inner shaft and an outer shaft in the case of upshifting from the first shift position to the second shift position.

FIG. 12A shows a change in rotational speed of the inner and outer shafts 43 and 44 in the case of automatic shifting from the first shift position (odd-numbered shift position) to the second shift position (even-numbered shift position). The rotational speeds of the shafts 43 and 44 can be obtained by detecting the rotational speed of the free gear (49c or 49d) with the rotation sensor (401 or 402).

Referring to FIG. 8, the driven gear 49e of the counter shaft 29 is moved to the left by the operation of the corresponding shift fork 24b to thereby engage the dog D3e of the slide gear 49e with the dog D3a of the free gear 49a. In this condition, the first clutch 51a is fully engaged and the second clutch 51b is partially engaged by supplying a minimum oil pressure required for the rotation of the outer shaft 44 induced by the rotation of the clutch outer 56. However, the shift gear pairs on the outer shaft 44 are in a completely neutral condition where the transmission of power from the outer shaft 44 to the counter shaft 29 is not allowed. According to this control, both the inner shaft 43 and the outer shaft 44 are rotated at substantially the same speed, wherein the transmission of power at the first shift position is effected by only the inner shaft 43 and the outer shaft 44 is idly rotated by the rotation of the clutch outer 56 (the condition shown by L5 in FIG. 12A). Thus, the transmission of power at the first shift position is performed through the first clutch 51a, the inner shaft 43, and the shift gear pair 45a corresponding to the first shift position to the counter shaft 29.

When the electronic control unit 42 determines that a suitable shift timing is reached, the automatic shifting from the first shift position to the second shift position is performed. As a standby condition for the second shift position, the supply of the minimum oil pressure to the second clutch 51b as required for the induced rotation of the outer shaft 44 is stopped.

Thereafter, the slide gear 49f of the counter shaft 29 is moved to the right by the operation of the corresponding shift fork 24b to thereby engage the dog D3f of the slide gear 49f with the dog D3b of the free gear 49b, thus establishing the shift gear pair 45b corresponding to the second shift position. As a result, the rotational speed of the outer shaft 44 rotating with the inner shaft 43 at substantially the same speed rapidly falls substantially linearly (the condition shown by L6 in FIG. 12A). The rotational speed of the outer shaft 44 at a bottom point B1 shown in FIG. 12A is a rotational speed at the second shift position according to a vehicle speed.

A change in rotational speed of the outer shaft 44 at this time is detected by detecting the rotational speed of the free gear 49d constituting the shift gear pair 45d connected at the left end of the outer shaft 44 by means of the rotation sensor 402. This change in rotational speed and the rotational speed at the bottom point B1 mean the establishment of the engagement of the dog D3f of the slide gear 49f and the dog D3b of the free gear 49b, i.e., the completion of the standby condition for the second shift position.

The rotation sensor 402 is connected to the electronic control unit 42. The electronic control unit 42 detects the completion of the standby condition for the second shift position according to an output signal from the rotation sensor 402. Thereafter, the electronic control unit 42 disengages the first clutch 51a and engages the second clutch 51b. Thereafter, the driven gear 49e of the counter shaft 29 is moved to the right as viewed in FIG. 8 by the operation of the corresponding shift fork 24b to thereby bring all the shift gear pairs of the inner shaft 43 into a condition where the transmission of power from the inner shaft 43 to the counter shaft 29 is not allowed, i.e., a substantially completely neutral condition. Thereafter, the first clutch 51a is partially engaged by supplying a minimum oil pressure required for the rotation of the inner shaft 43 induced by the rotation of the clutch outer 56. In this condition, the transmission of power at the second shift position is effected by only the outer shaft 44 and the inner shaft 43 is idly rotated by the rotation of the clutch outer 56 (the condition shown by L7 in FIG. 12A). Thus, the transmission of power at the second shift position is performed through the second clutch 51b, the outer shaft 44, and the shift gear pair 45b corresponding to the second shift position to the counter shaft 29.

According to this preferred embodiment, automatic shifting is performed in the condition where the inner shaft 43 or the outer shaft 44 is idly rotated as shown in FIG. 12A. The rotational speed of the outer shaft 44 changes from substantially the same rotational speed as that of the inner shaft 43 to the rotational speed according to the second shift position. Accordingly, the amount of a rapid change in rotational speed of the outer shaft 44 can be reduced to thereby suppress the generation of noise in the automatic shifting.

The phenomenon shown in FIG. 12A commonly occurs in automatic shifting including upshifting and downshifting in the case that the present shift position is an odd-numbered shift position (the first, third, or fifth shift position) and the next shift position is an even-numbered shift position (the second, fourth, or sixth shift position). Accordingly, in the stage of obtaining the standby condition for any shift position, the rotational speed of the outer shaft 44 always changes. Therefore, by detecting this change in rotational speed by means of the rotation sensor 402, the establishment of the engagement of the dog of any slide gear and the dog of the corresponding free gear for each shift position can be accurately detected. In this preferred embodiment, the rotational speed of the outer shaft 44 at the bottom point B1 is a rotational speed at the second, fourth, or sixth shift position according to a vehicle speed, so that the shifting from the odd-numbered shift position to the even-numbered shift position can be smoothly performed.

Figure 12B:
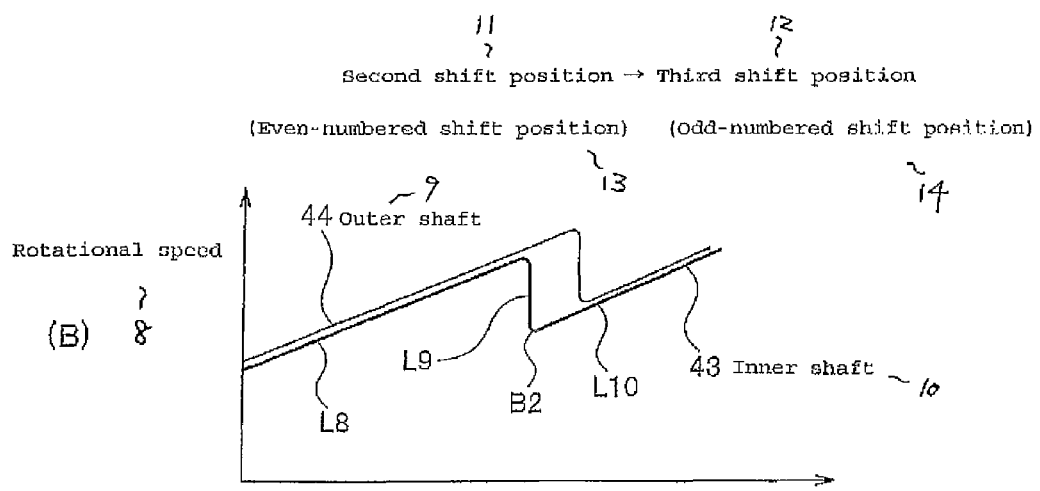
FIG. 12B is a graph similar to FIG. 12A in the case of upshifting from the second shift position to the third shift position.

FIG. 12B shows a change in rotational speed of the inner and outer shafts 43 and 44 in the case of automatic shifting from the second shift position (even-numbered shift position) to the third shift position (odd-numbered shift position).

As mentioned above, at the second shift position, only the outer shaft 44 performs the transmission of power and the inner shaft 43 is idly rotated (the condition shown by L8 in FIG. 12B). In the case of automatic shifting from the second shift position to the third shift position, the first clutch 51a is disengaged (the supply of the minimum oil pressure required for the induced rotation of the inner shaft 43 is stopped). Thereafter, the slide gear 49e is moved to the right as viewed in FIG. 8 by the operation of the corresponding shift fork 24b to thereby engage the dog D2e of the slide ring Se with the dog D2c of the free gear 49c, thus establishing the shift gear pair 45c corresponding to the third shift position.

At this time, the rotational speed of the inner shaft 43 rapidly falls substantially linearly (the condition shown by L9 in FIG. 12B) until it reaches a rotational speed at the third shift position according to the vehicle speed. The rotational speed of the inner shaft 43 at a bottom point B2 shown in FIG. 12B is a rotational speed at the third shift position according to the vehicle speed. A change in rotational speed of the inner shaft 43 at this time is detected by detecting the rotational speed of the free gear 49c by means of the rotation sensor 401. This change in rotational speed means the establishment of the engagement of the dog D2e of the slide gear 49e and the dog D2c of the free gear 49c, i.e., the completion of the standby condition of the third shift position.

The rotation sensor 401 is connected to the electronic control unit 42. The electronic control unit 42 detects the completion of the standby condition for the third shift position according to an output signal from the rotation sensor 401. Thereafter, the electronic control unit 42 disengages the second clutch 51b and engages the first clutch 51a. Thereafter, the slide gear 49f of the counter shaft 29 is moved to the left as viewed in FIG. 8 by the operation of the corresponding shift fork 24b to thereby bring all the shift gear pairs of the outer shaft 44 into a condition where the transmission of power from the outer shaft 44 to the counter shaft 29 is not allowed, i.e., a substantially completely neutral condition. Thereafter, the second clutch 51b is partially engaged by supplying a minimum oil pressure required for the rotation of the outer shaft 44 induced by the rotation of the clutch outer 56. In this condition, the transmission of power at the third shift position is effected by only the inner shaft 43 and the outer shaft 44 is idly rotated by the rotation of the clutch outer 56 (the condition shown by L10 in FIG. 12B). Thus, the transmission of power at the third shift position is performed through the first clutch 51a, the inner shaft 43, and the shift gear pair 45c corresponding to the third shift position to the counter shaft 29.

According to this preferred embodiment, automatic shifting is performed in the condition where the inner shaft 43 or the outer shaft 44 is idly rotated as shown in FIG. 12B. Accordingly, the amount of change in the rotational speed of the inner shaft 43 can be reduced to thereby suppress the generation of noise in the automatic shifting.

The phenomenon shown in FIG. 12B commonly occurs in automatic shifting including upshifting and downshifting in the case that the present shift position is an even-numbered shift position (the second, fourth, or sixth shift position) and the next shift position is an odd-numbered shift position (the first, third, or fifth shift position). Accordingly, in the stage of obtaining the standby condition for any shift position, the rotational speed of the inner shaft 43 always changes. Therefore, by detecting this change in rotational speed by means of the rotation sensor 401, the establishment of the engagement of the dog of any slide gear and the dog of the corresponding free gear for each shift position can be accurately detected. In this preferred embodiment, the rotational speed of the inner shaft 43 at the bottom point B2 is a rotational speed at the first, third, or fifth shift position according to a vehicle speed, so that the shifting from the even-numbered shift position to the odd-numbered shift position can be smoothly performed.

A fixing structure for the rotation sensors 401 and 402 will now be described.

Figure 13:
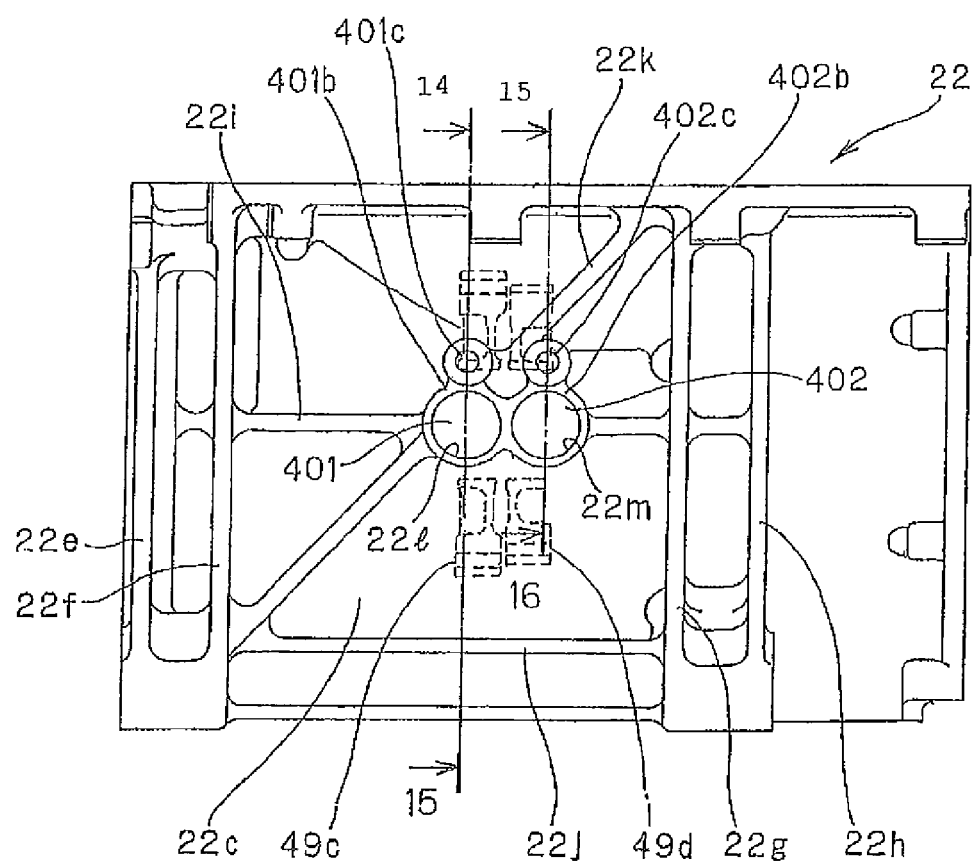
FIG. 13 is a view taken in the direction shown by an arrow X in FIG. 2.

As shown in FIG. 2, the rotation sensors 401 and 402 are fixed to the rear surface 22c of the transmission case 22 so as to be juxtaposed in the lateral direction of the vehicle. As viewed in side elevation, the rotation sensors 401 and 402 are located behind the second gear cover 117 or the drive shaft 332. With this arrangement, the rotation sensors 401 and 402 can be protected from bouncing stones or the like by the second gear cover 117 or the drive shaft 332. FIG. 13 is a rear view of the transmission case 22, i.e., a view taken in the direction shown by an arrow X in FIG. 2. As shown in FIG. 13, the rear surface 22c of the transmission case 22 is integrally formed with a plurality of (seven in this preferred embodiment) ribs 22e, 22f, 22g, 22h, 22i, 22j, and 22k. These ribs 22e to 22k are classified into four vertical ribs 22e, 22f, 22g, and 22h, two horizontal ribs 22i and 22j, and one diagonal rib 22k. Thus, the rear surface 22c is reinforced by the ribs 22e to 22k. Two openings 22l and 22m are formed at an intersecting portion between the horizontal rib 22i and the diagonal rib 22k so as to be juxtaposed in the lateral direction. The rotation sensors 401 and 402 are fixed in the openings 22l and 22m of the rear surface 22c, respectively.

Figure 14:
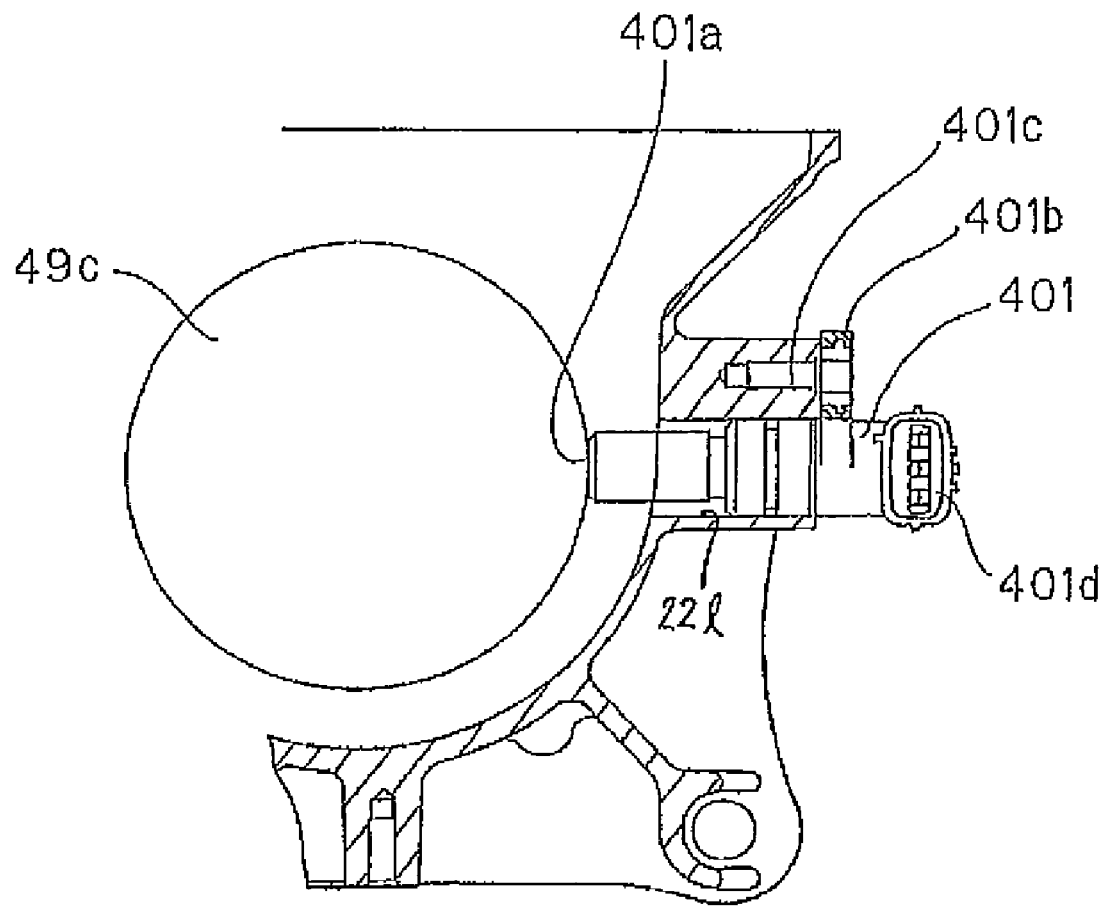
FIG. 14 is a cross section taken along the line 14-14 in FIG. 13.

As shown in FIG. 14, the rotation sensor 401 is opposed to the free gear 49c so as to be inserted through the opening 22l. The rotation sensor 401 is integrally formed with a supporting portion 401b. The supporting portion 401b is fixed to the rear surface 22c of the transmission case 22 by means of a screw 401c. The rotation sensor 401 further has a connector 401d.

Figure 15:
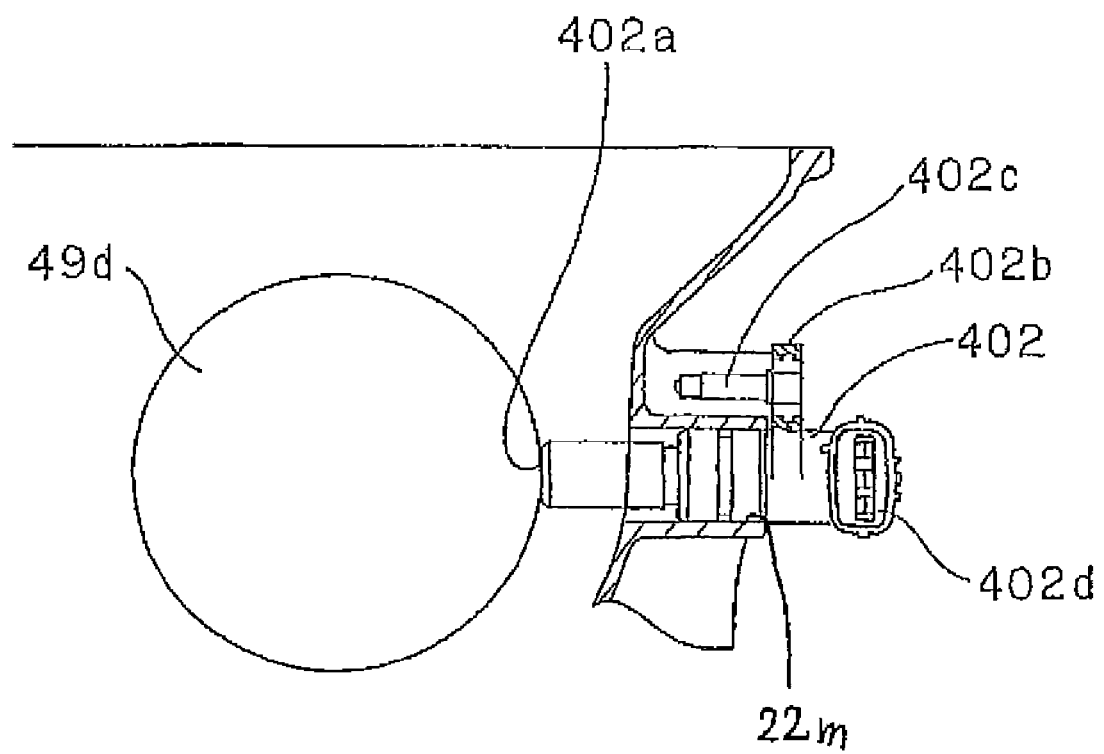
FIG. 15 is a cross section taken along the line 15-15 in FIG. 13.

On the other hand, as shown in FIG. 15, the rotation sensor 402 is opposed to the free gear 49d so as to be inserted through the opening 22m. The rotation sensor 402 is integrally formed with a supporting portion 402b. The supporting portion 402b is fixed to the rear surface 22c of the transmission case 22 by means of a screw 402c. The rotation sensor 402 further has a connector 402d.

The openings 22l and 22m are formed through the rear wall 22c of the transmission case 22 so as to be juxtaposed in the lateral direction. However, since the rear surface 22c is reinforced by the ribs 22c to 22k and the openings 22l and 22m are located at the intersecting portion between the horizontal rib 22i and the diagonal rib 22k, the strength of the rear wall 22c can be maintained. Further, various parts of an exhaust system or an intake system are located above the transmission case 22 in general. According to this preferred embodiment, the rotation sensors 401 and 402 are fixed to the rear surface 22c of the transmission case 22. Accordingly, the flexibility of the location of the parts of the exhaust system or the intake system is not limited by the rotation sensors 401 and 402.

According to this preferred embodiment, the axial positions of the free gears 49c and 49d are fixed and the rotation sensors 401 and 402 are opposed to the free gears 49c and 49d, respectively. Accordingly, the relative positional relation between the rotation sensor 401 and the free gear 49c in the axial direction of the counter shaft 29 is fixed. Similarly, the relative positional relation between the rotation sensor 402 and the free gear 49d in the axial direction of the counter shaft 29 is fixed. Accordingly, the rotational speeds of the free gears 49c and 49d can be detected without increasing the facewidths of the free gears 49c and 49d, so that an increase in width of the engine E in the axial direction of the transmission M can be suppressed. Further, none of the shift forks 24b engages with the free gears 49c and 49d fixed in their axial position. Accordingly, the position of the shift drum 24a is not limited by the free gears 49c and 49d, thereby improving the flexibility of location of the shift drum 24a.

Further, the free gears 49c and 49d are axially juxtaposed to each other near the center of the counter shaft 29. Accordingly, wires for the rotation sensors 401 and 402 respectively corresponding to the free gears 49c and 49d can be collected, thereby improving the workability of wiring for the rotation sensors 401 and 402. The rotational speeds of the free gears 49c and 49d rotating with the rotation of the main shaft 28 are detected, thereby detecting the rotational speed of the main shaft 28.

According to this preferred embodiment, the free gears 49c and 49d are provided on the counter shaft 29 behind the main shaft 28, and are respectively in mesh with the drive gears 48c and 48d larger in diameter than the drive gear 48a having the smallest diameter in the drive gears 48a to 48f provided on the main shaft 28. In general, a gear on the counter shaft 29 as meshing with a gear having a smallest diameter on the main shaft 28 has a diameter larger than that of any other gear on the counter shaft 29. Accordingly, if the rotational speed of this gear meshing with the gear having the smallest diameter on the main shaft 28 is detected, the rotation sensors 401 and 402 project largely to the rear of the engine E, resulting in an increase in size of the engine E in the longitudinal direction of the vehicle.

According to this preferred embodiment, however, the rotation sensors 401 and 402 are respectively opposed to the free gears 49c and 49d meshing with the gears larger in diameter than the gear having the smallest diameter on the main shaft 28. Accordingly, the amount of projection of the rotation sensors 401 and 402 to the rear of the engine E can be suppressed to thereby reduce the size of the engine E.

The main shaft 28 has a double structure composed of the inner and outer shafts 43 and 44. The rotation sensor 401 is opposed to the teeth of the free gear 49c meshing with the drive gear 48c provided on the inner shaft 43, and the rotation sensor 402 is opposed to the teeth of the free gear 49d meshing with the drive gear 48d provided on the outer shaft 44. While the present invention is applied to a vehicle having a twin clutch type clutch device, the present invention is applicable also to a vehicle having any other types of clutch. For example, the present invention is applicable to any vehicle such that automatic shifting is performed by driving means as in AMT.

In general, the shaft ends of the transmission M are supported through bearings or the like to the crankcase 336. Accordingly, if the gears subjected to detection of their rotational speeds are provided near the shaft ends of the transmission M, the bearings must be shifted axially outward to ensure the space for locating the rotation sensors. As a result, the shaft length of the transmission M is increased to cause an increase in size of the engine E. According to this preferred embodiment, however, the gears subjected to detection of their rotational speeds are set as the free gears 49c and 49d located near the center of the counter shaft 29 of the transmission M. Accordingly, the rotation sensors 401 and 402 are located apart from the bearings for supporting the counter shaft 29 at its axial ends, so that the shaft length of the transmission M need not be increased to thereby suppress an increase in size of the engine E.

While a specific preferred embodiment of the present invention has been described above, it should be noted that the present invention is not limited to the above preferred embodiment, but various modifications may be made without departing from the scope of the present invention as defined in the appended claims.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An internal combustion engine having a crankcase in which a crankshaft and a transmission are accommodated, said transmission having a plurality of gears for shifting, an input shaft for inputting a rotational drive force from said crankshaft, and an output shaft to which the rotational drive force is transmitted from said input shaft through said gears, the rotational drive force being further transmitted from said output shaft to a drive wheel, wherein said internal combustion engine comprises:
    a rotation detecting device for detecting the rotational speed of a specific one of said gears included in said transmission, said rotation detecting device having a detecting portion opposed to said specific gear rotating with the rotation of said input shaft and positioned in an axial direction of said transmission,
    wherein said rotation detecting device is provided on a rear surface of said crankcase, and has an axis extending parallel to a shaft portion of a bevel gear which extends perpendicular to the input shaft.

2. The internal combustion engine according to claim 1, wherein said specific gear is provided near the center of said input shaft or said output shaft in the axial direction thereof.

3. The internal combustion engine according to claim 1, wherein said rotation detecting device is protected from bouncing stones by gear cover attached to the rear surface of the crankcase, and the shaft portion of the bevel gear projects rearward from the gear cover.

4. The internal combustion engine according to claim 1, wherein said rotation detecting device on the rear surface of said crankcase is located under a rear head cover.

5. The internal combustion engine according to claim 3, wherein said specific gear is provided on said output shaft behind said input shaft and in mesh with a gear larger in diameter than a gear having the smallest diameter in the gears provided on said input shaft.

6. The internal combustion engine according to claim 4, wherein said specific gear is provided on said output shaft behind said input shaft and in mesh with a gear larger in diameter than a gear having the smallest diameter in the gears provided on said input shaft.

7. The internal combustion engine according to claim 1, wherein said input shaft comprises a first input shaft and a second input shaft;
    a first clutch is provided on said first input shaft and a second clutch is provided on said second input shaft, the transmission of the rotational drive force from said crankshaft to said input shaft being controlled by the operation of said first and second clutches; and
    said rotation detecting device comprises a plurality of rotation sensors respectively corresponding to the gears rotating with the rotation of said first and second input shafts, for detecting the rotational speeds of said first and second input shafts, wherein the plurality of rotation sensors includes a pair of rotation sensors mounted directly adjacent to each other on the rear surface of the transmission case.

8. The internal combustion engine according to claim 7, wherein the gears rotating with the rotation of said first and second input shafts are juxtaposed to each other in the axial direction of said transmission.

9. The internal combustion engine according to claim 1, wherein the specific one of the gears wherein the rotation is detected are driven gears that are free gears as compared to other gears that are slide gears.

10. The internal combustion engine according to claim 9, wherein the slide gears are operatively connected to a change mechanism for changing the transmission to another shift position.

11. An internal combustion engine comprising:
a crankcase;
a crankshaft and a transmission operatively mounted within said crankcase;
said transmission including a plurality of gears for shifting from one shift position to another;
an input shaft for inputting a rotational drive force from said crankshaft;
an output shaft wherein the rotational drive force is transmitted from said input shaft through said gears, the rotational drive force being further transmitted from said output shaft to a drive wheel; and
a rotation detecting device for detecting the rotational speed of a specific one of said gears included in said transmission;
said rotation detecting device having a detecting portion directly opposed to said specific gear rotating with the rotation of said input shaft and positioned in an axial direction of said transmission,
wherein said rotation detecting device is provided on a rear surface of a transmission case which forms part of said crankcase, and
wherein said specific gear is provided on a counter shaft extending parallel to the crankshaft.

12. The internal combustion engine according to claim 11, wherein said specific gear is provided near the center of said input shaft or said output shaft in the axial direction thereof.

13. The internal combustion engine according to claim 11, wherein said rotation detecting device is provided on said crankcase protected from bouncing stones by gear cover attached to the rear surface of the transmission case.

14. The internal combustion engine according to claim 11, wherein said rotation detecting device on the rear surface of the transmission case is located under a rear head cover.

15. The internal combustion engine according to claim 13, wherein said specific gear is provided on said output shaft behind said input shaft and in mesh with a gear larger in diameter than a gear having the smallest diameter in the gears provided on said input shaft.

16. The internal combustion engine according to claim 14, wherein said specific gear is provided on said output shaft behind said input shaft and in mesh with a gear larger in diameter than a gear having the smallest diameter in the gears provided on said input shaft.

17. The internal combustion engine according to claim 11, wherein said input shaft comprises a first input shaft and a second input shaft;
a first clutch is provided on said first input shaft and a second clutch is provided on said second input shaft, the transmission of the rotational drive force from said crankshaft to said input shaft being controlled by the operation of said first and second clutches; and
said rotation detecting device comprises a plurality of rotation sensors respectively corresponding to the gears rotating with the rotation of said first and second input shafts, for detecting the rotational speeds of said first and second input shafts,
wherein the plurality of rotation sensors includes a pair of rotation sensors mounted directly adjacent to each other on the rear surface of the transmission case.

18. The internal combustion engine according to claim 17, wherein the gears rotating with the rotation of said first and second input shafts are juxtaposed to each other in the axial direction of said transmission.

19. The internal combustion engine according to claim 11, wherein the specific one of the gears wherein the rotation is detected are driven gears that are free gears as compared to other gears that are slide gears.

20. The internal combustion engine according to claim 19, wherein the slide gears are operatively connected to a change mechanism for changing the transmission to another shift position.

* * * * *